US007288603B2

(12) United States Patent
Sakaguchi et al.

(10) Patent No.: US 7,288,603 B2
(45) Date of Patent: Oct. 30, 2007

(54) POLYBENZAZOLE COMPOUND HAVING SULFONIC ACID GROUP AND/OR PHOSPHONIC ACID GROUP, RESIN COMPOSITION CONTAINING THE SAME, RESIN MOLDING, SOLID POLYMER ELECTROLYTE MEMBRANE, SOLID POLYMER ELECTROLYTE MEMBRANE/ELECTRODE ASSEMBLY AND METHOD OF PREPARING ASSEMBLY

(75) Inventors: Yoshimitsu Sakaguchi, Ohtsu (JP); Kota Kitamura, Ohtsu (JP); Hiroaki Taguchi, Osaka (JP); Junko Nakao, Wakayama (JP); Shiro Hamamoto, Ohtsu (JP); Hiroshi Tachimori, Ohtsu (JP); Satoshi Takase, Ohtsu (JP)

(73) Assignee: Toyo Boseki Kabushiki Kaisha, Osaka-Shi, Osaka (JP)

( * ) Notice: Subject to any disclaimer, the term of this patent is extended or adjusted under 35 U.S.C. 154(b) by 673 days.

(21) Appl. No.: 10/416,551

(22) PCT Filed: Nov. 12, 2001

(86) PCT No.: PCT/JP01/09885

§ 371 (c)(1),
(2), (4) Date: Oct. 28, 2003

(87) PCT Pub. No.: WO02/38650

PCT Pub. Date: May 16, 2002

(65) Prior Publication Data

US 2004/0062969 A1    Apr. 1, 2004

(30) Foreign Application Priority Data

| Nov. 13, 2000 | (JP) | ................................ 2000-345604 |
| Nov. 13, 2000 | (JP) | ................................ 2000-345606 |
| Nov. 15, 2000 | (JP) | ................................ 2000-348328 |
| Nov. 15, 2000 | (JP) | ................................ 2003-348327 |
| Jan. 9, 2001 | (JP) | ................................ 2001-001615 |
| Jan. 10, 2001 | (JP) | ................................ 2001-002661 |
| Mar. 30, 2001 | (JP) | ................................ 2001-101021 |
| Mar. 30, 2001 | (JP) | ................................ 2001-101022 |

(51) Int. Cl.
*C08L 71/00* (2006.01)
*C08G 69/42* (2006.01)
*C08G 79/02* (2006.01)
*H01M 4/00* (2006.01)
*H01B 1/06* (2006.01)
*C25C 7/00* (2006.01)

(52) U.S. Cl. ...................... 525/411; 528/337; 528/171; 528/172; 528/173; 528/183; 528/186; 528/342; 528/352; 264/248; 429/33; 429/41; 521/27

(58) Field of Classification Search ................ 525/411; 528/337, 171, 172, 173, 183, 186, 342, 352; 264/248; 204/282; 429/33, 41; 521/27

See application file for complete search history.

(56) References Cited

U.S. PATENT DOCUMENTS

| 3,574,169 | A | * | 4/1971 | D'Alelio ..................... 528/337 |
| 4,597,784 | A | * | 7/1986 | Albrecht et al. ............ 528/337 |
| 4,634,530 | A | | 1/1987 | Kuder et al. |
| 5,312,895 | A | * | 5/1994 | Dang et al. ................. 528/337 |
| 5,492,996 | A | * | 2/1996 | Dang et al. ................. 528/171 |
| 5,498,784 | A | * | 3/1996 | Arnold et al. .............. 528/337 |
| 5,599,639 | A | | 2/1997 | Sansone et al. |
| 5,723,086 | A | * | 3/1998 | Ledjeff et al. .............. 264/248 |

FOREIGN PATENT DOCUMENTS

| GB | 1202721 | A | * | 7/1970 |
| JP | 04 353533 | | | 12/1992 |
| JP | 06 093114 | | | 4/1994 |
| JP | 09 110982 | A | | 4/1997 |

(Continued)

OTHER PUBLICATIONS

Ahmad, Z et al, Mechanical properties of hybrid materials consisting of benzoxazole copolymrs and silica, Polym Mater Sci Eng, 1993, 70, 303-304.*

(Continued)

*Primary Examiner*—Randy Gulakowski
*Assistant Examiner*—A. Toscano
(74) *Attorney, Agent, or Firm*—Kenyon & Kenyon LLP

(57) ABSTRACT

An object of the present invention is to obtain a novel polymeric material capable of forming a solid polymer electrolyte excellent not only in processability, solvent resistance and durability/stability but also in ion conductivity by introducing sulfonic acid group or phosphonic acid group into a polybenzazole compound having excellent properties in view of heat resistance, solvent resistance, mechanical characteristics and the like.

Means attaining the object of the present invention is a polybenzazole compound including an aromatic dicarboxylic acid bond unit having sulfonic acid group and/or phosphonic acid group and satisfying either a condition that inherent viscosity measured in concentrated sulfuric acid is in the range of 0.25 to 10 dl/g or a condition that inherent viscosity measured in a methanesulfonic acid solution is in the range of 0.1 to 50 dl/g.

The object of the present invention can be attained also by a resin composition containing the aforementioned polybenzazole compound, a resin molding, a solid polymer electrolyte membrane, a solid polymer electrolyte membrane/electrode assembly and a method of preparing the solid polymer electrolyte membrane/electrode assembly.

49 Claims, 6 Drawing Sheets

FOREIGN PATENT DOCUMENTS

| JP | 10 158213 | 6/1998 |
| JP | 11 286545 | 10/1999 |
| WO | WO94/14203 | 6/1994 |
| WO | WO 01/01506 A1 | 1/2001 |

OTHER PUBLICATIONS

RJ Spry et al, Anisotropic Ionic Conductivity of Lithium Doped Sulfonated PBI, J Polym Sci pt B: Poly Phys, 1987, 35(17), 2925.*

Ahmed, Z et al, Mechanical properties of hybrid materials consisting of benzoxazole copolymers and silica, Polym Mater Sci Eng, 1993, 70, 303.*

RJ Spry et al, Anisotropic ionic conductivity of lithium doped sulfonated PBI, J Polym Sci pt B, Poly Phys, 1997, 35(17), 2925.*

Spry et al, J Polymer Science part B, Poly Physics, 1997, 35(17), 2925.*

R.J. Spry et al., "Anisotropic Iuonic Conductivity of Lithium-Doped Sulfonated PBI", J. Polym. Sci., Part B: Polym. Phys., (1977), 35(17), pp. 2925 to 2933.

Ahmad, Z. et al., "Mechanical Properties of Hybrid Materials Consisting of Benzoxazole Copolymers and Silica", Polm. Mater. Sci. Eng., (1993), 70, pp. 303-304.

R. Nolte et al., "Partially Sulfonated Poly (Arylene Ether Sulfone)- A Versatile Proton Conducting Membrane Material for Modern Energy Conversion Technologies", Journal of Membrane Science, 83 (1993) pp. 211-220.

U. Keikichi et al., "Synthesis of Polybenzimidazoles with Sulfonic Acid Groups", Journal of Polymer Chemistry Edition, vol. 15, (1977), pp. 1309-1318.

S. Kim et al., Aromatic and Rigid Rod Polyelectrolytes Based on Sulfonated Poly(benzobisthiazoles), Journal of Polymer Science: part A: Polymer Chemistry, vol. 34, (1996), pp. 481-492.

* cited by examiner

POLYBENZAZOLE COMPOUND HAVING SULFONIC ACID GROUP AND/OR PHOSPHONIC ACID GROUP, RESIN COMPOSITION CONTAINING THE SAME, RESIN MOLDING, SOLID POLYMER ELECTROLYTE MEMBRANE, SOLID POLYMER ELECTROLYTE MEMBRANE/ELECTRODE ASSEMBLY AND METHOD OF PREPARING ASSEMBLY

CROSS REFERENCE TO RELATED APPLICATION

This application is a national stage application of PCT/JP01/09885, filed on Nov. 12, 2001 and claiming priority of JP 2000-345604, filed on Nov. 13, 2000, JP 2000-345606, filed on Nov. 13, 2000, JP 2000-348327, filed on Nov. 15, 2000, JP 2000-348328, filed on Nov. 15, 2000, JP 2001-001615, filed Jan. 9, 2001, JP 2001-002661, filed on Jan. 10, 2001, JP 2001-101021, filed on Mar. 30, 2001, and JP 2001-101022, filed Mar. 30, 2001.

TECHNICAL FILED

The present invention relates to a polybenzazole compound having sulfonic acid group and/or phosphonic acid group useful as a solid polymer electrolyte membrane, a resin composition containing the same, a resin molding, a solid polymer electrolyte membrane, a solid polymer electrolyte membrane/electrode assembly and a method of preparing the assembly.

BACKGROUND ART

At present, fuel cell is watched with interest as a candidate for the power generation system friendly to the terrestrial environment substituting for thermal power generation. The fuel cell is not the kind of the so-called dry cell or storage cell used by storing electricity. While water generates hydrogen and oxygen when electrically hydrolyzed, the fuel cell utilizes a principle reverse thereto. In other words, the fuel cell is a new power generation system directly converting chemical energy to electric energy by electrochemical reaction of hydrogen and oxygen through a catalyst or the like.

The fuel cell is not restricted by the Carnot cycle since the same is a power generation system directly converting chemical energy to electric energy, and theoretically has remarkably superior generation efficiency as compared with thermal power generation since the same causes neither heat transfer loss nor mechanical loss. However, even the fuel cell cannot entirely convert thermal energy obtained in combustion, i.e., change of enthalpy (denoted by $\Delta H$) to electric energy but can merely convert change of Gibbs free energy (denoted by $\Delta G$) to electric energy.

In practice, theoretically possible maximum efficiency (theoretical efficiency) of a fuel cell fueled by hydrogen is:

$H_2$ (gas)+$1/2 O_2$ (gas)→$H_2O$ (liquid)

$\Delta H = -285.83$ kJ/mol $\Delta G = -237.13$ kJ/mol

Hence,

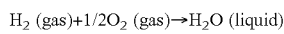

Thus, the theoretical efficiency of the fuel cell exhibits a high value by far exceeding the theoretical efficiency of a heat engine shown by the Carnot cycle. Similarly, the theoretical efficiency exhibits a value exceeding 90% also when the fuel cell is fueled by methane or alcohol.

However, it is difficult to approach the theoretical efficiency in an actual fuel cell at the present stage. The reason for this is that various energy loss takes place in the fuel cell and a supplemental apparatus for the fuel cell and the energy is discharged from the fuel cell as thermal energy.

At present, loss in the fuel cell is the maximum loss in the power generation system formed by the fuel cell, and the power generation efficiency of the fuel cell can be remarkably improved by reducing such loss.

For the aforementioned reason, active research and development are performed in various fields, to develop various types of fuel cells such as phosphoric acid-, solid polymer-, molten carbonate- and solid electrolyte-type cells.

Among these fuel cells, the solid polymer electrolyte fuel cell (also abbreviated as PEFC) operating at a lower temperature as compared with other types of fuel cells has small constraint in the materials used such that the same can be prepared from a low-priced material such as plastic, carbon or stainless steel for readily reducing the cost, and is gathering interests. Further, the PEFC can be miniaturized as compared with other types of fuel cells and is suitable to a mobile power source or a small capacity power source.

The history of development of the PEFC was first started by General Electric, U.S.A., in the latter half of 1950s, and a fuel cell utilizing hydrogen/oxygen having output power of 1 kW was embarked on the spaceship Gemini in the first half of 1960s. While the polymer electrolyte membrane used at the beginning was a polystyrene membrane of which chemical durability was poor, the chemical durability of the PEFC has been remarkably improved by the fluoropolymer electrolyte membrane "Nafion (R)" developed by Du Pont, U.S.A. for fuel cells in the space development project of NASA, and development of the PEFC was stimulated. At present, application of the PEFC to automobiles or domestic use thereof is mainly studied rather than conventional space or military use.

The polymer electrolyte membrane forming the heart of the PEFC serves as a kind of ion-exchange membrane, and must have excellent ion conductivity, physical strength, gas barrier properties, chemical stability, electrochemical stability and thermal stability. Therefore, a perfluorocarbonsulfonic acid membrane represented by "Nafion (R)" by Du Pont, U.S.A. has mainly been used as a polymer electrolyte membrane usable over a long period. In general, the perfluorocarbonsulfonic acid membrane has fluorine atoms in the main chain and side chains, and sulfonic acid groups in the side chains to which protons can be added.

When the general perfluorocarbonsulfonic acid membrane is operated under a condition exceeding 100° C., however, the water content of the membrane is abruptly reduced and the membrane is remarkably softened. In a direct methanol fuel cell, therefore, performance is so reduced due to methanol crossover in the membrane that the fuel cell cannot exhibit sufficient performance. In a fuel cell fueled by hydrogen and operated under a condition around 80° C., the high cost of perfluorocarbonsulfonic acid membrane also hinders practicalization of the fuel cell. Moreover, available perfluorocarbonsulfonic acid membrane limited in thickness and ion exchange capacity and designing of the fuel cell is also restricted.

In order to overcome such disadvantages, various types of electrolyte membranes prepared by introducing sulfonic acid groups into aromatic polymers are studied. For example, sulfonated polyaryl ethersulfone (Journal of Membrane Science, 83, 211 (1993)), sulfonated polyetherether ketone (Japanese Patent Laying-Open No. 6-93114), sulfonated polystyrene and the like can be listed. However, sulfonic acid groups introduced into aromatic rings based on polymer reaction readily cause desulfonation by acid or heat, and cannot be regarded as sufficient in durability to be used as an electrolyte membrane for a fUel cell.

An aromatic polyazole polymer such as polyimidazole is known as a polymer having high heat resistance and high durability, and sulfonic acid groups may conceivably be introduced into such a polymer for utilizing the same for the aforementioned object. As a compound having such a polymer structure, polybenzimidazole having sulfonic acids synthesized from 3,3'-diaminobenzidine and 3,5-dicarboxybenzensulfonic acid or 2,5-dicarboxybenzensulfonic acid (Uno et al., J. Polym. Sci., Polym. Chem., 15, 1309 (1977)) or synthesized with main components of 1,2,4,5-benzenetetramine and 2,5-dicarboxybenzensulfonic acid (U.S. Pat. No. 5,312,895) has been reported.

In these reports, although solubility and heat resistance of polybenzimidazole having sulfonic acid have been described, no attention has been directed to electrochemical properties of sulfonic acid groups such as application to a solid polymer electrolyte membrane. In particular, these compounds are inferior in compatibility of heat resistance, solvent resistance and mechanical properties and ion conductivity, and unsuitable for application to a solid polymer electrolyte membrane or the like.

Also as to that related to polybenzoxazole or polybenzthiazole having sulfonic acid groups, polymers synthesized from 2,5-diamino-1,4-benzenedithiol and 3,5-dicarboxybenzenesulfonic acid or 4,6-dicarboxy-1,3-benzenedisulfonic acid (J. Polym. Sci., Polym. Chem., 34, 481 (1996)), polymers synthesized from 2,5-diamino-1,4-benzenediol and 3,5-dicarboxybenzenesulfonic acid (Japanese Patent Laying-Open No. 10-158213), a compound prepared by sulfonation of a compound synthesized from 2,5-diamino-1,4-benzenediol and terephthalic acid (Japanese Patent Laying-Open No. 4-353533) or a compound synthesized from 2,5-dicarboxysulfonic acid and various diaminediol or diaminedithiol (U.S. Pat. No. 5,492,996) has been reported.

However, none of these has noted sulfonic acid groups as functional groups for proton conductivity, and none has exhibited sufficient durability under a condition employed as a fuel cell. For example, while the technique disclosed in U.S. Pat. No. 5,492,996 is characterized in converting sulfonic acid groups to alkyl ammonium salt in order to derive alcohol solubility of the polymer, it is obvious that the same is unsuitable for use as the material for a fuel cell since alcohol solubility is a critical defect in application to the aforementioned fuel cell fueled by methanol or the like.

On the other hand, few aromatic polymers having phosphonic acid groups conceivably superior in heat resistance to sulfonic acid groups was reported in view of application to a solid polymer electrolyte. Polybenzoxazoles comprising of 4,4'-(2,2,2-trifluoro-1-(trifluoromethyl)ethylidene)bis(2-aminophenol) in which 5 to 50% of dicarboxylic acid was 3.5-dicarboxyphenyl phosphonic acid (U.S. Pat. No. 5,498, 784) were reported as a rare example. These polymers showed excellent solubility and a possibility as a composite material, however, this polymer has not been taken into consideration as a solid polyelectrolyte for a fuel cell. In practice, it is obvious that alcohol solubility of these polymers is unsuitable for use as a solid polyelectrolyte for a fuel cell fueled by methanol. It can be said that this polymer is unsuitable for a solid polyelectrolyte for a fuel cell also in the point that the same exhibits only low ion conductivity.

In addition, a phosphorus-containing polyamide copolymer such as 3,5-dicarboxyphenylphosphonic acid has been reported (Japanese Patent Laying-Open No. 11-286545), while only properties related to heat resistance have been investigated also in this polymer. Further, this polymer causes hydrolysis under an acidic condition used as a fuel cell, and cannot be used as an electrolyte membrane.

In general, ionic group-containing polyazole polymers are hard to mold and also hard to hold its form even if a molding is obtained. This is conceivably because only a polymer having a low degree of polymerization is obtained by introduction of ionic groups. Therefore, it has been difficult to obtain a polymer utilizable as a solid polymer electrolyte such as a proton-exchange membrane.

DISCLOSURE OF THE INVENTION

An object of the present invention is to obtain a novel polymeric material capable of providing a solid polymer electrolyte excellent not only in processability, solvent resistance and durability/stability but also in ion conductivity by introducing sulfonic acid groups or phosphonic acid groups into a polybenzazole compound having excellent properties in heat resistance, solvent resistance, mechanical characteristics and the like.

The inventors have made deep study in order to attain the aforementioned object, to find that a specific polybenzazole compound containing sulfonic acid groups or phosphonic acid groups exhibits excellent processability, durability, solvent resistance, mechanical properties and ion conductivity, and obtained a novel polymeric material satisfying the object of the present invention.

A first aspect of the present invention is a polybenzazole compound including an aromatic dicarboxylic acid bond unit having sulfonic acid group and/or phosphonic acid group and satisfying either a condition that inherent viscosity measured in concentrated sulfuric acid is in the range of 0.25 to 10 dl/g or a condition that inherent viscosity measured in a methanesulfonic acid solution is in the range of 0.1 to 50 dl/g.

A second aspect of the present invention is the polybenzazole compound according to the first aspect, including the aromatic dicarboxylic acid bond unit having sulfonic acid group and/or phosphonic acid group with a benzazole bond unit bonded by random polymerization and/or alternating polymerization and satisfying either the condition that inherent viscosity measured in concentrated sulfuric acid is in the range of 0.25 to 10 dl/g or the condition that inherent viscosity measured in a methanesulfonic acid solution is in the range of 0.1 to 50 dl/g.

A third aspect of the present invention is the polybenzazole compound according to the first aspect, characterized in that conductivity obtained by measuring complex impedance when applying a voltage of 10,000 Hz in frequency under conditions of 80° C. and 95% RH is in the range of 0.01 to 1.0 S/cm.

A fourth aspect of the present invention is the polybenzazole compound according to the third aspect, including a benzoxazole bond unit and/or a benzthiazole bond unit and including the aromatic dicarboxylic acid bond unit having at least one sulfonic acid group in molecules, characterized in that the inherent viscosity measured in a methanesulfonic acid solution is in the range of 0.1 to 50 dl/g and the conductivity obtained by measuring complex impedance when applying the voltage of 10,000 Hz in frequency under the conditions of 80° C. and 95% RH is in the range of 0.3 to 1.0 S/cm.

A fifth aspect of the present invention is the polybenzazole compound according to the fourth aspect, including bond units expressed in the following formulas (1) and (2) in a molar ratio $n^1:(1-n^1)$ as components, with the molar ratio satisfying an expression $0.5 \leq n^1 \leq 1.0$:

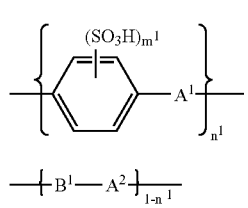

(1)

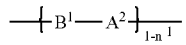

(2)

where $m^1$ represents an integer of 1 to 4, $B^1$ represents a bivalent aromatic bond unit and each of $A^1$ and $A^2$ represents a bivalent bond unit expressed in either one of the following formulas (3) and (4) in each of the formulas (1) and (2). $A^1$ and $A^2$ may be identical to or different from each other:

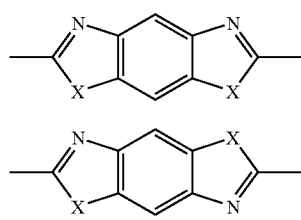

(3)

(4)

where X represents either S atom or O atom in each of the formulas (3) and (4).

A sixth aspect of the present invention is the polybenzazole compound according to the first aspect, including the aromatic dicarboxylic acid bond unit having phosphonic acid group, characterized in that conductivity obtained by measuring complex impedance when applying a voltage of 10,000 Hz in frequency under conditions of 80° C. and 95% RH is in the range of 0.001 to 1.0 S/cm.

A seventh aspect of the present invention is the polybenzazole compound according to the first aspect, including a benzoxazole bond unit and the aromatic dicarboxylic acid bond unit having phosphonic acid group, characterized in that conductivity obtained by measuring complex impedance when applying a voltage of 10,000 Hz in frequency under conditions of 80° C. and 95% RH is in the range of 0.01 to 1.0 S/cm.

An eighth aspect of the present invention is the polybenzazole compound according to the first aspect, including a benzimidazole bond unit, characterized in that solubility in N-methylpyrrolidone under a condition of 170° C. is at least 5% (w/w) and the inherent viscosity measured in concentrated sulfuric acid is in the range of 0.25 to 10 dl/g.

A ninth aspect of the present invention is the polybenzazole compound according to the first aspect, including a benzoxazole bond unit and including the aromatic dicarboxylic acid bond unit having at least one sulfonic acid group in molecules, characterized in that the inherent viscosity measured in a methanesulfonic acid solution is in the range of 0.1 to 50 dl/g and solubility in dimethylsulfoxide under a condition of 40° C. is at least 1% (w/w).

A tenth aspect of the present invention is the polybenzazole compound according to the ninth aspect, including bond units expressed in the following formulas (5) and (6) in a molar ratio $n^2:(1-n^2)$ as components, characterized in that the molar ratio satisfies an expression $0.85 \leq n^2 \leq 1.0$ and sulfonic acid groups in the form of alkaline metal salts are in the range of 0 to 15 mol % among all sulfonic acid groups:

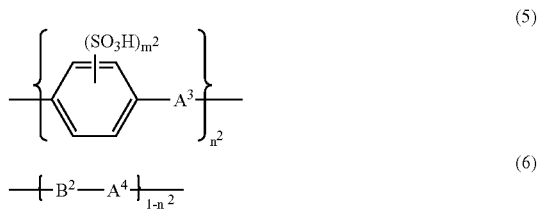

(5)

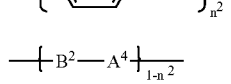

(6)

where $m^2$ represents an integer of 1 to 4, $B^2$ represents a bivalent aromatic bond unit and each of $A^3$ and $A^4$ represents a bivalent bond unit expressed in either one of the following formulas (7) and (8) in each of the formulas (5) and (6). $A^3$ and $A^4$ may be identical to or different from each other.

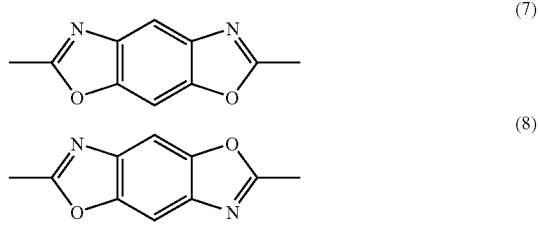

(7)

(8)

An eleventh aspect of the present invention is the polybenzazole compound according to the eighth aspect, characterized in that conductivity obtained by measuring complex impedance when applying a voltage of 10,000 Hz in frequency under conditions of 80° C. and 95% RH is in the range of 0.01 to 1.0 S/cm.

A twelfth aspect of the present invention is the polybenzazole compound according to the fourth aspect, including a benzoxazole bond unit and the aromatic dicarboxylic acid bond unit having a sulfonic acid group, characterized in that solubility in dimethylsulfoxide under a condition of 40° C. is at least 1% (w/w).

A thirteenth aspect of the present invention is the polybenzazole compound according to the twelfth aspect, including bond units expressed in the following formulas (9) and (10) in a molar ratio $n^3:(1-n^3)$ as components, characterized in that the molar ratio satisfies an expression $0.85 \leq n^3 \leq 1.0$ and sulfonic acid groups in the form of alkaline metal salts are in the range of 0 to 10 mol % among all sulfonic acid groups:

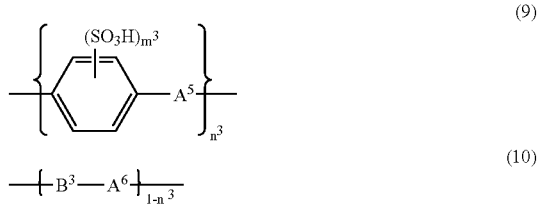

(9)

(10)

where $m^3$ represents an integer of 1 to 4, $B^3$ represents a bivalent aromatic bond unit and each of $A^5$ and $A^6$ represents a bivalent bond unit expressed in either one of the following formulas (11) and (12) in each of the formulas (9) and (10). $A^5$ and $A^6$ may be identical to or different from each other.

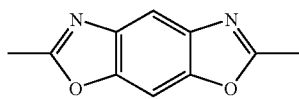

(11)

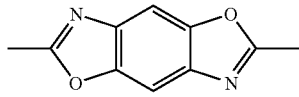

(12)

A fourteenth aspect of the present invention is the polybenzazole compound according to the first aspect, having at least 1.5 meq/g of sulfonic acid groups and/or phosphonic acid groups in molecules, characterized in that reduction of mass is in the range of 0 to 5% (w/w) when immersed in water of 25° C. for 72 hours.

A fifteenth aspect of the present invention is the polybenzazole compound according to the fourteenth aspect, including bond units expressed in the following formulas (13) and (14) in a molar ratio $n^4:(1-n^4)$ as components, with the molar ratio satisfying an expression $0.4 \leq n^4 \leq 1.0$:

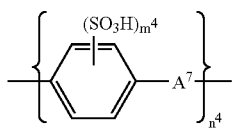

(13)

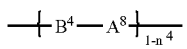

(14)

where $m^4$ represents an integer of 1 to 4, $B^4$ represents a bivalent aromatic bond unit and each of $A^7$ and $A^8$ represents a bivalent bond unit expressed in either one of the following formulas (15) and (16) in each of the formulas (13) and (14). $A^7$ and $A^8$ may be identical to or different from each other:

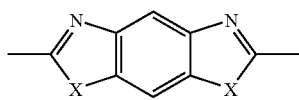

(15)

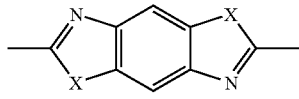

(16)

where X represents either S atom or O atom in each of the formulas (15) and (16).

A sixteenth aspect of the present invention is the polybenzazole compound according to the fifth aspect, having at least 1.5 meq/g of sulfonic acid groups in molecules, characterized in that reduction of mass is in the range of 0 to 5% (w/w) when immersed in water of 25° C. for 72 hours.

A seventeenth aspect of the present invention is the polybenzazole compound according to the first aspect, having at least 2.5 meq/g of sulfonic acid groups and/or phosphonic acid groups in molecules, characterized in that reduction of mass is in the range of 0 to 5% (w/w) when immersed in water of 25° C. for 72 hours and solubility in dimethylsulfoxide under a condition of 40° C. is at least 1% (w/w).

An eighteenth aspect of the present invention is the polybenzazole compound according to the seventeenth aspect, including bond units expressed in the following formulas (17) and (18) in a molar ratio $n^5:(1-n^5)$ as components, with the molar ratio satisfying an expression $0.85 \leq n^5 \leq 1.0$:

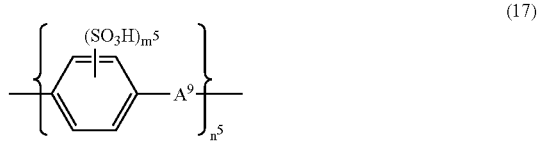

(17)

(18)

where $m^5$ represents an integer of 1 to 4, $B^5$ represents a bivalent aromatic bond unit and each of $A^9$ and $A^{10}$ represents a bivalent bond unit expressed in either one of the following formulas (19) and (20) in each of the formulas (17) and (18). $A^9$ and $A^{10}$ may be identical to or different from each other.

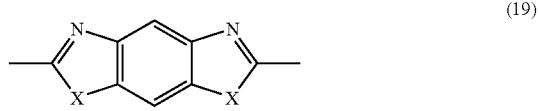

(19)

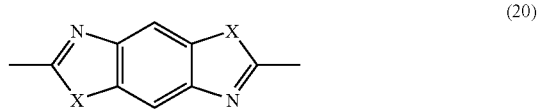

(20)

where X represents either S atom or O atom in each of the formulas (19) and (20).

A nineteenth aspect of the present invention is the polybenzazole compound according to the eighteenth aspect, characterized in that conductivity obtained by measuring complex impedance when applying a voltage of 10,000 Hz in frequency under conditions of 80° C. and 95% RH is in the range of 0.3 to 1.0 S/cm.

A twentieth aspect of the present invention is the polybenzazole compound according to the third aspect, characterized in that a 3% mass reduction temperature is in the range of 370 to 550° C. with reference to mass upon temperature rise to 200° C. in thermogravimetric analysis.

A twenty-first aspect of the present invention is the polybenzazole compound according to the first aspect, including the aromatic dicarboxylic acid bond unit having phosphonic acid group, characterized in that a 3% mass reduction temperature is in the range of 400 to 550° C. with reference to mass upon temperature rise to 200° C. in thermogravimetric analysis.

A twenty-second aspect of the present invention is the polybenzazole compound according to the twenty-first aspect, characterized in that solubility in N-methylpyrrolidone under a condition of 170° C. is at least 5% (w/w).

A twenty-third aspect of the present invention is the polybenzazole compound according to the twenty-second aspect, characterized in that conductivity obtained by measuring complex impedance when applying a voltage of 10,000 Hz in frequency under conditions of 80° C. and 95% RH is in the range of 0.001 to 1.0 S/cm.

A twenty-fourth aspect of the present invention is the polybenzazole compound according to the first aspect, including bond units expressed in the following formulas (21) and (22) in a molar ratio $n^6:(1-n^6)$ as components, with the molar ratio satisfying an expression $0.2 \leq n^6 \leq 1.0$:

(21)

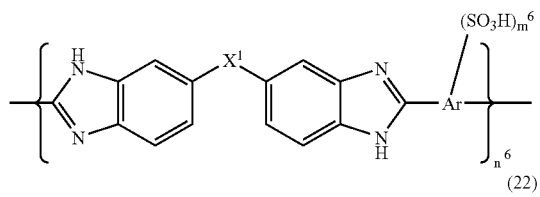

(22)

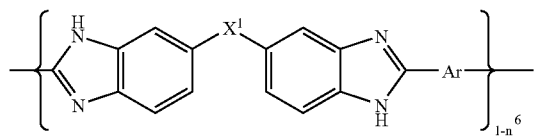

where $m^6$ represents an integer of 1 to 4, Ar represents an aromatic bond unit, $X^1$ represents at least one selected from a group consisting of —O—, —SO$_2$—, —C(CH$_3$)$_2$—, —C(CF$_3$)$_2$— and —OPhO— and Ph represents a bivalent aromatic bond unit in each of the formulas (21) and (22).

A twenty-fifth aspect of the present invention is the polybenzazole compound according to the third aspect, including bond units expressed in the following formulas (23) and (24) in a molar ratio $n^7:(1-n^7)$ as components, with the molar ratio satisfying an expression $0.2 \leq n^7 \leq 1.0$:

(23)

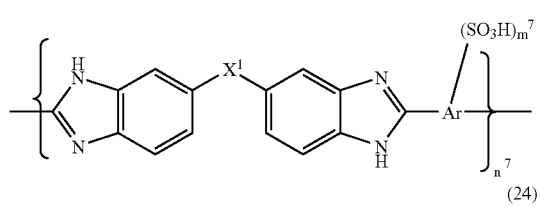

(24)

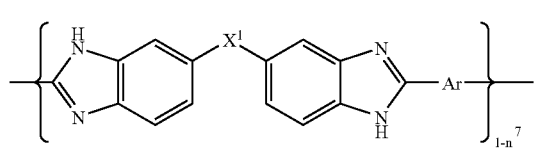

where $m^7$ represents an integer of 1 to 4, Ar represents an aromatic bond unit, $X^1$ represents at least one selected from a group consisting of —O—, —SO$_2$—, —C(CH$_3$)$_2$—, —C(CF$_3$)$_2$— and —OPhO— and Ph represents a bivalent aromatic bond unit in each of the formulas (23) and (24).

A twenty-sixth aspect of the present invention is the polybenzazole compound according to the eighth aspect, including bond units expressed in the following formulas (25) and (26) in a molar ratio $n^8:(1-n^8)$ as components, with the molar ratio satisfying an expression $0.2 \leq n^8 \leq 1.0$:

(25)

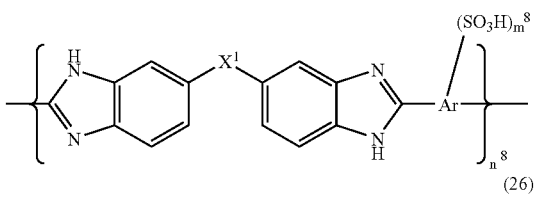

(26)

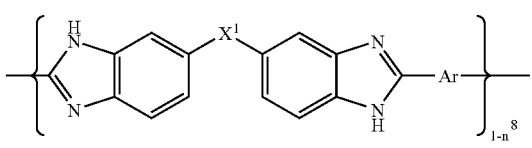

where $m^8$ represents an integer of 1 to 4, Ar represents an aromatic bond unit, $X^1$ represents at least one selected from a group consisting of —O—, —SO$_2$—, —C(CH$_3$)$_2$—, —C(CF$_3$)$_2$— and —OPhO— and Ph represents a bivalent aromatic bond unit in each of the formulas (25) and (26).

A twenty-seventh aspect of the present invention is the polybenzazole compound according to the eleventh aspect, including bond units expressed in the following formulas (27) and (28) in a molar ratio $n^9:(1-n^9)$ as components, with the molar ratio satisfying an expression $0.2 \leq n^9 \leq 1.0$:

(27)

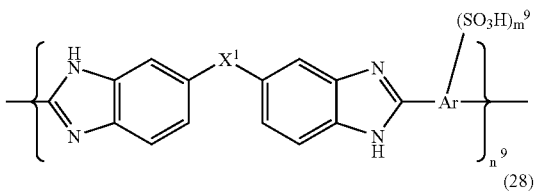

(28)

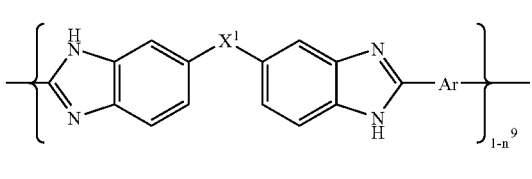

where $m^9$ represents an integer of 1 to 4, Ar represents an aromatic bond unit, $X^1$ represents at least one selected from a group consisting of —O—, —SO$_2$—, —C(CH$_3$)$_2$—, —C(CF$_3$)$_2$— and —OPhO— and Ph represents a bivalent aromatic bond unit in each of the formulas (27) and (28).

A twenty-eighth aspect of the present invention is the polybenzazole compound according to the twentieth aspect, including bond units expressed in the following formulas (29) and (30) in a molar ratio $n^{10}:(1-n^{10})$ as components, with the molar ratio satisfying an expression $0.2 \leq n^{10} \leq 1.0$:

(29)

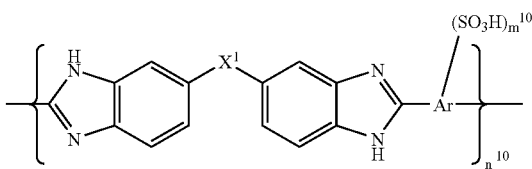

-continued

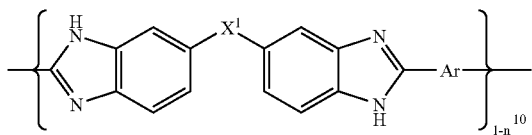
(30)

where $m^{10}$ represents an integer of 1 to 4, Ar represents an aromatic bond unit, $X^1$ represents at least one selected from a group-consisting of —O—, —SO$_2$—, —C(CH$_3$)$_2$—, —C(CF$_3$)$_2$— and —OPhO— and Ph represents a bivalent aromatic bond unit in each of the formulas (29) and (30).

A twenty-ninth aspect of the present invention is the polybenzazole compound according to the first aspect, including the aromatic dicarboxylic acid bond unit having phosphonic acid group and containing no fluorine atom.

A thirtieth aspect of the present invention is the polybenzazole compound according to the sixth aspect, including the aromatic dicarboxylic acid bond unit having phosphonic acid group and containing no fluorine atom.

A thirty-first aspect of the present invention is the polybenzazole compound according to the seventh aspect, including the aromatic dicarboxylic acid bond unit having phosphonic acid group and containing no fluorine atom.

A thirty-second aspect of the present invention is the polybenzazole compound according to the eighth aspect, including the aromatic dicarboxylic acid bond unit having phosphonic acid group and containing no fluorine atom.

A thirty-third aspect of the present invention is the polybenzazole compound according to the eleventh aspect, including the aromatic dicarboxylic acid bond unit having phosphonic acid group and containing no fluorine atom.

A thirty-fourth aspect of the present invention is the polybenzazole compound according to the seventeenth aspect, including the aromatic dicarboxylic acid bond unit having phosphonic acid group and containing no fluorine atom.

A thirty-fifth aspect of the present invention is the polybenzazole compound according to the twenty-first aspect, including the aromatic dicarboxylic acid bond unit having phosphonic acid group and containing no fluorine atom.

A thirty-sixth aspect of the present invention is the polybenzazole compound according to the twenty-second aspect, including the aromatic dicarboxylic acid bond unit having phosphonic acid group and containing no fluorine atom.

A thirty-seventh aspect of the present invention is the polybenzazole compound according to the twenty-third aspect, including the aromatic dicarboxylic acid bond unit having phosphonic acid group and containing no fluorine atom.

A thirty-eighth aspect of the present invention is a resin composition containing the polybenzazole compound including the aromatic dicarboxylic acid bond unit having sulfonic acid group and/or phosphonic acid group according to any of the first to thirty-seventh aspects and a polybenzazole compound having no ionic group as main components.

A thirty-ninth aspect of the present invention is a resin molding containing the polybenzazole compound according to any of the first to thirty-seventh aspects as a main component.

A fortieth aspect of the present invention is a solid polymer electrolyte membrane containing the polybenzazole compound according to any of the first to thirty-seventh aspects as a main component.

A forty-first aspect of the present invention is a solid polymer electrolyte membrane/electrode assembly including a solid polymer electrolyte membrane and electrode catalytic layers jointed to both surfaces of the solid polymer electrolyte membrane as components, characterized in that the solid polymer electrolyte membrane and/or the electrode catalytic layers contain the polybenzazole compound according to any of the first to thirty-seventh aspects as a component.

A forty-second aspect of the present invention is the solid polymer electrolyte membrane/electrode assembly according to the forty-first aspect, characterized in that the polybenzazole compound forming the solid polymer electrolyte membrane and/or the electrode catalytic layers has at least 2.5 meq/g of sulfonic acid groups and/or phosphonic acid groups in molecules.

A forty-third aspect of the present invention is a method of preparing a solid polymer electrolyte membrane/electrode assembly including a step of bonding a solid polymer electrolyte membrane and electrode catalytic layers jointed to both surfaces of the solid polymer electrolyte membrane to each other with a binder, characterized in that the solid polymer electrolyte membrane and/or the electrode catalytic layers contain the polybenzazole compound according to any of the first to thirty-seventh aspects as a component and the binder also contains the polybenzazole compound according to any of the first to thirty-seventh aspects as a component.

A forty-fourth aspect of the present invention is the method of preparing a solid polymer electrolyte membrane/electrode assembly according to the forty-third aspect, characterized in that the polybenzazole compound forming the solid polymer electrolyte membrane and/or the electrode catalytic layers has at least 2.5 meq/g of sulfonic acid groups and/or phosphonic acid groups in molecules and the polybenzazole compound forming the binder also has at least 2.5 meq/g of sulfonic acid groups and/or phosphonic acid groups in molecules.

BEST MODE FOR CARRYING OUT THE INVENTION

Figure 1:
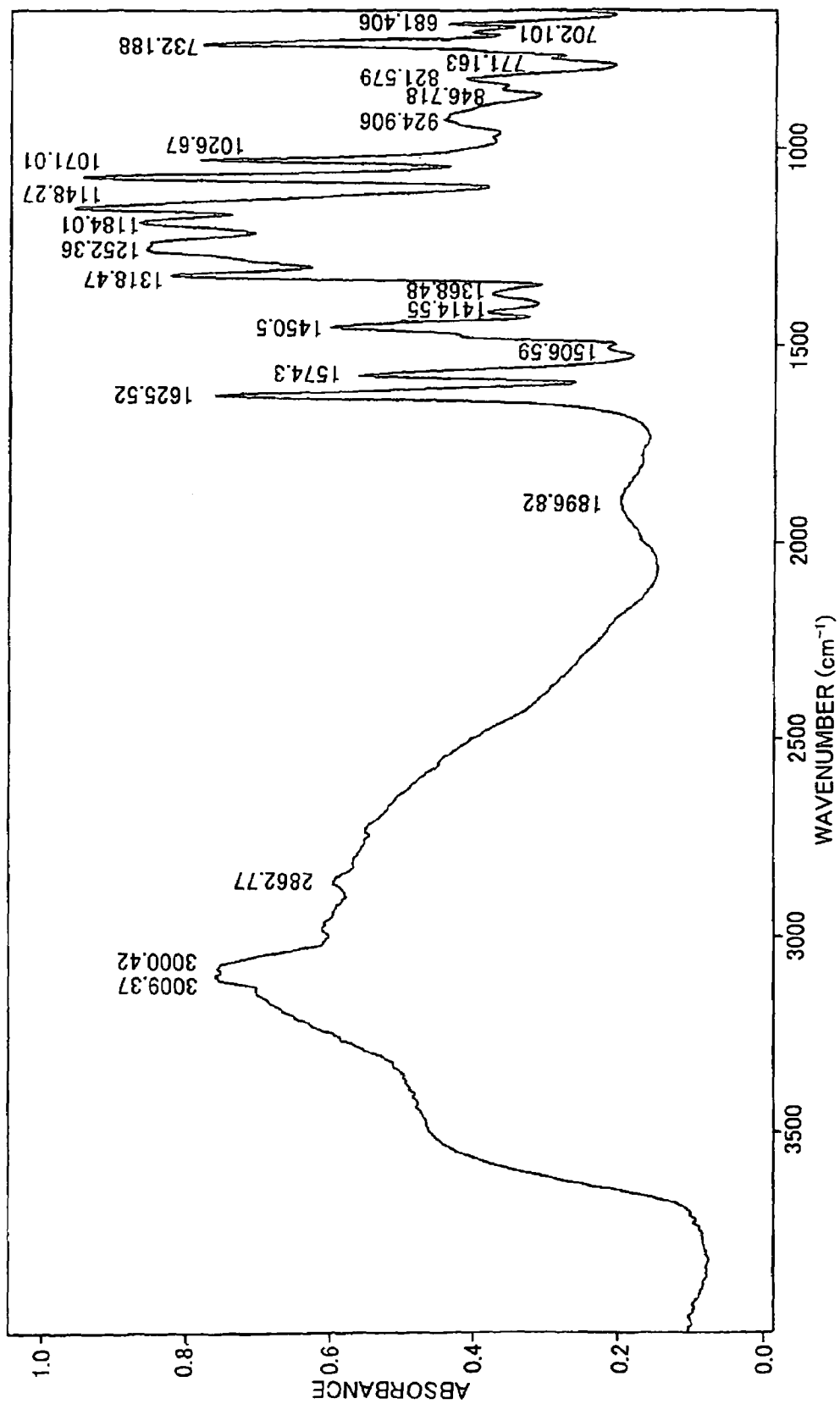
FIG. 1 is a diagram showing the IR spectrum of a polybenzimidazole compound having sulfonic acid groups synthesized from TAS and STA.

The present invention is now described in more detail.

The inventive polybenzazole compound having sulfonic acid group and/or phosphonic acid group (also simply referred to as the inventive polybenzazole compound in this specification) is a novel material exhibiting excellent properties not only in durability but also in workability and ion conductivity. The inventive polybenzazole compound having such excellent properties can be preferably used as the material for a solid polymer electrolyte membrane for fuel cells.

The basic structure of the present invention is a polybenzazole compound including an aromatic dicarboxylic acid bond unit having sulfonic acid group and/or phosphonic acid group and satisfying either a condition that inherent viscosity measured in concentrated sulfuric acid is in the range of 0.25 to 10 dl/g or a condition that inherent viscosity measured in a methanesulfonic acid solution is in the range of 0.1 to 50 dl/g.

A benzazole bond unit, the aromatic dicarboxylic acid bond unit having sulfonic acid group and/or phosphonic acid group, an aromatic dicarboxylic acid bond unit having neither sulfonic acid group nor phosphonic acid group and a further bond unit forming the inventive polybenzazole compound are preferably bonded by random polymerization and/or alternating polymerization. Further, the polymerization form of these units is not restricted to one type but at least two types of polymerization forms may coexist in the same compound.

<Polybenzazole Compound>

It is assumed that the inventive polybenzazole compound having sulfonic acid group and/or phosphonic acid group denotes at least one selected from a group consisting of polybenzimidazole compounds, polybenzoxazole compounds and polybenzthiazole compounds having sulfonic acid group and/or phosphonic acid group.

While the path for synthesizing such a compound is not particularly restricted, the compound can be synthesized by reaction between at least one compound selected from a group consisting of aromatic tetramines, aromatic diaminediols and aromatic diaminedithiols capable of forming imidazole rings, oxazole rings or thiazole rings in the compound and derivatives thereof and at least one compound selected from a group consisting of aromatic dicarboxylic acid and a derivative thereof in general.

When partially mixing aromatic dicarboxylic acid having sulfonic acid group and/or phosphonic acid group and/or a derivative thereof into the used aromatic dicarboxylic acid and/or the derivative thereof, the sulfonic acid group and/or the phosphonic acid group can be introduced into the obtained polybenzazole compound. At this time, the sulfonic acid group and/or the phosphonic acid group introduced into the aromatic dicarboxylic acid and/or the derivative thereof may be in the form of a salt such as an alkaline metal.

<Aromatic Tetramine, Diaminediol and Diaminedithiol>

While aromatic tetramine, aromatic diaminediol, aromatic diaminedithiol and derivatives thereof employable for synthesizing the inventive polybenzazole compound having sulfonic acid group and/or phosphonic acid group are not particularly restricted, 2,5-dihydroxyparaphenylenediamine, 4,6-dihydroxymethaphenylenediamine, 2,5-diamino-1,4-benzenedithiol, 4,6-diamino-1,3-benzenedithiol, 2,5-di-amino-3,6-dimethyl-1,4-benzenedithiol, 1,2,4,6-tetraaminobenzene, 3,3'-dihydroxybenzidine, 3,3'-diamino-4,4'-diphenylbenzenediol, 3,3'-dimercaptobenzidine, 3,3'-diamino-4,4'-diphenylbenzenedithiol, 3,3'-diaminobenzidine, bis(4-amino-3-hydroxyphenyl) ether, bis(3-amino-4-hydroxyphenyl) ether, bis(4-amino-3-mercaptophenyl) ether, bis(3-amino-4-mercaptophenyl) ether, 3,3',4,4'-tetraaminodiphenyl ether, bis(4-amino-3-hydroxyphenyl) thioether, bis(3-amino-4-hydroxyphenyl) thioether, bis(4-amino-3-mercaptophenyl) thioether, bis(3-amino-4-mercaptophenyl) thioether, 3,3',4,4'-tetraaminodihpenyl thioether, bis(4-amino-3-hydroxyphenyl)sulfone, bis(3-amino-4-hydroxyphenyl)sulfone, bis(4-amino-3-mercaptophenyl)sulfone, bis(3-amino-4-mercaptophenyl)sulfone, 3,3',4,4'-tetraaminodiphenylsulfone, 2,2-bis(4-amino-3-hydroxyphenyl)propane, 2,2-bis(3-amino-4-hydroxyphenyl)propane, 2,2-bis(4-amino-3-mercaptophenyl)propane, 2,2-bis(3-amino-4-mercaptophenyl)propane, 2,2-bis(3,4-diaminophenyl) propane, bis(4-amino-3-hydroxyphenyl)methane, bis(3-amino-4-hydroxyphenyl)methane, bis(4-amino-3-mercaptophenyl)methane, bis(3-amino-4-mercaptophenyl) methane, bis(3,4-diamonophenyl)methane, 2,2-bis(4-amino-3-hydroxyphenyl)hexafluoropropane, 2,2-bis(3-amino-4-hydroxyphenyl)hexafluoropropane, 2,2-bis(4-amino-3-mercaptophenyl)hexafluoropropane, 2,2-bis(3-amino-4-mercaptophenyl)hexafluoropropane, 2,2-bis(3,4-diaminophenyl)hexafluoropropane, 2,2-bis(4-amino-3-hydroxyphenyl)ketone, 2,2-bis(3-amino-4-hydroxyphenyl) ketone, 2,2-bis(4-amino-3-mercaptophenyl)ketone, 2,2-bis(3-amino-4-mercaptophenyl)ketone, 2,2-bis(3,4-diaminophenyl)ketone, bis(4-amino-3-hydroxyphenoxy) benzene, bis(3-amino-4-hydroxyphenoxy)benzene, bis(4-amino-3-mercaptophenoxy)benzene, bis(3-amino-4-mercaptophenoxy)benzene and bis(3,4,-diaminophenoxy) benzene and derivatives thereof can be listed, for example.

As specific examples of the derivatives of these aromatic tetramines, aromatic diaminediols and aromatic diaminedithiols, salts with acids such as hydrochloric acid, sulfuric acid and phosphoric acid can be listed. While these compounds may be singly used, it is also possible to simultaneously use a plurality of such compounds. Further, these compounds may contain a well-known antioxidant such as tin (II) chloride or a phosphorous acid compound if necessary.

<Aromatic Dicarboxylic Acid Having Sulfonic Acid Group>

Aromatic dicarboxylic acid having sulfonic acid group and derivative thereof employed for synthesizing the inventive polybenzazole compound having sulfonic acid group and/or phosphonic acid group are not particularly restricted but a compound having one to four sulfonic acid groups in the aromatic dicarboxylic acid can be preferably used. As specific examples, aromatic dicarboxylic acids having sulfonic acid group such as 2,5-dicarboxybenzenesulfonic acid, 3,5-dicarboxybenzenesulfonic acid, 2,5-dicarboxy-1,4-benzenedisulfonic acid, 4,6-dicarboxy-1,3-benzenedisulfonic acid and 2,2'-disulfo-4,4'-biphenyldicarboxylic acid and derivatives thereof can be listed.

As sulfonic acid derivatives of such aromatic dicarboxylic acid materials having sulfonic acid groups, alkaline metal salts of sodium, potassium and the like and an ammonium salt can be listed. While these compounds may be singly used, it is also possible to simultaneously use a plurality of such compounds. Further, these compounds may contain a well-known antioxidant such as tin (II) chloride or a phosphorous acid compound if necessary.

The purity of aromatic dicarboxylic acid having sulfonic acid group employed for synthesizing the inventive polybenzazole compound is not particularly restricted but at least 98% is preferable and at least 99% is more preferable. A polybenzazole compound polymerized from a raw material of aromatic dicarboxylic acid having sulfonic acid group exhibits such a tendency that the degree of polymerization is lower than that in a case of employing aromatic dicarboxylic acid having neither sulfonic acid group nor phosphonic acid group as the raw material, and hence it is preferable to employ aromatic dicarboxylic acid having sulfonic acid group exhibiting the highest possible purity. If the purity of aromatic dicarboxylic acid is less than 98%, there is such a tendency that the degree of polymerization of the obtained polybenzazole compound is so lowered that the compound is unsuitable as the material for a solid polymer electrolyte.

The aforementioned aromatic dicarboxylic acid having sulfonic acid group may be singly used, while the same may alternatively be copolymerized with aromatic dicarboxylic acid having neither sulfonic acid group nor phosphonic acid group to be employed for synthesizing the inventive polybenzazole compound having sulfonic acid group and/or phosphonic acid group. Aromatic dicarboxylic acid having neither sulfonic acid group nor phosphonic acid group usable with aromatic dicarboxylic acid having sulfonic acid group is not particularly restricted but general aromatic dicarboxylic acids reported as starting materials for polyesters such as terephthalic acid, isophthalic acid, naphthalenedicarboxylic acid, diphenyl ether dicarboxylic acid, diphenylsulfonedicarboxylic acid, biphenyldicarboxylic acid, terphenyldicarboxylic acid, 2,2-bis(4-carboxyphenyl)hexafluoropropane or the like can be used, for example.

While these compounds may be singly used, it is also possible to simultaneously use a plurality of such compounds. Further, these compounds may contain a well-known antioxidant such as tin (II) chloride or a phosphorous acid compound if necessary.

When using aromatic dicarboxylic acid having neither sulfonic acid group nor phosphonic acid group with aromatic dicarboxylic acid having sulfonic acid group for synthesizing the inventive polybenzazole compound, it is possible to clarify an excellent effect attained by introduction of the sulfonic acid group into the inventive polybenzazole compound by compounding the aromatic dicarboxylic acid having sulfonic acid group so that the content thereof is at least 20 mol % in the total aromatic dicarboxylic acid. In order to derive a salient effect attained by introducing the sulfonic acid group into the inventive polybenzazole compound, it is further preferable to compound aromatic dicarboxylic acid having sulfonic acid group so that the content thereof is at least 50 mol %. If the content of aromatic dicarboxylic acid having sulfonic acid group is less than 20 mol %, there is such a tendency that the conductivity of the inventive polybenzazole compound is so lowered that the compound is unsuitable as the material for a solid polymer electrolyte.

<Aromatic Dicarboxylic Acid having Phosphonic Acid Group>

Aromatic dicarboxylic acid having phosphonic acid group and derivative thereof employed for synthesizing the inventive polybenzazole compound having sulfonic acid group and/or phosphonic acid group are not restricted but a compound having one to four phosphonic acid groups in the aromatic dicarboxylic skeleton can be preferably used. As specific examples, aromatic dicarboxylic acid having phosphonic acid group such as 2,5-dicarboxyphenylphosphonic acid, 3,5-dicarboxyphenylphosphonic acid and 2,5-bisphosphonoterephthalic acid and derivatives thereof can be listed.

As phosphonic acid derivatives of such aromatic dicarboxylic acid having phosphonic acid group, alkaline metal salts of sodium, potassium and the like and an ammonium salt can be listed. While these compounds may be singly used, it is also possible to simultaneously use a plurality of such compounds. Further, these compounds may contain a well-known antioxidant such as tin (II) chloride or a phosphorous acid compound if necessary.

While the structure of aromatic dicarboxylic acid having a phosphonic acid group is not restricted to the above, aromatic dicarboxylic acid having a phenylphosphonic type acid group shown in the above is preferable.

The purity of aromatic dicarboxylic acid having phosphonic acid group employed for synthesizing the inventive polybenzazole compound is not particularly restricted but at least 97% is preferable and at least 98% is more preferable. A polybenzazole compound polymerized from a raw material of aromatic dicarboxylic acid having phosphonic acid group exhibits such a tendency that the degree of polymerization is lower than that in a case of employing aromatic dicarboxylic acid having neither sulfonic acid group nor phosphonic acid group as the raw material, and hence it is preferable to employ aromatic dicarboxylic acid having phosphonic acid group exhibiting the highest possible purity. If the purity of aromatic dicarboxylic acid is less than 97%, there is such a tendency that the degree of polymerization of the obtained polybenzazole compound is so lowered that the compound is unsuitable as the material for a solid polymer electrolyte.

The aforementioned aromatic dicarboxylic acid having a phosphonic acid group may be singly used, while the same may alternatively be copolymerized with aromatic dicarboxylic acid having neither sulfonic acid group nor phosphonic acid group to be employed for synthesizing the inventive polybenzazole compound having sulfonic acid group and/or phosphonic acid group. Aromatic dicarboxylic acid having neither sulfonic acid group nor phosphonic acid group usable with aromatic dicarboxylic acid having phosphonic acid group is not particularly restricted but general aromatic dicarboxylic acids reported as starting materials for polyesters such as terephthalic acid, isophthalic acid, naphthalenedicarboxylic acid, diphenyl ether dicarboxylic acid, diphenylsulfonedicarboxylic acid, biphenyldicarboxylic acid, terphenyldicarboxylic acid, 2,2-bis(4-carboxyphenyl)hexafluoropropane or the like can be used.

While these compounds maybe singly used, it is also possible to simultaneously use a plurality of such compounds. Further, these compounds may contain a well-known antioxidant such as tin (II) chloride or a phosphorous acid compound if necessary.

When using aromatic dicarboxylic acid having neither sulfonic acid group nor phosphonic acid group with aromatic dicarboxylic acid having a phosphonic acid group for synthesizing the inventive polybenzazole compound, it is possible to clarify an excellent effect attained by introduction of the phosphonic acid group into the inventive polybenzazole compound by compounding aromatic dicarboxylic acid having phosphonic acid group so that the content thereof is at least 20 mol % in the total aromatic dicarboxylic acid. In order to derive a salient effect attained by introducing the phosphonic acid group into the inventive polybenzazole compound, it is further preferable to compound aromatic dicarboxylic acid having phosphonic acid group so that the content thereof is at least 50 mol %. If the content of aromatic dicarboxylic acid having phosphonic acid group is less than 20 mol %, there is such a tendency that the conductivity of the inventive polybenzazole compound is so lowered that the compound is unsuitable as the material for a solid polymer electrolyte.

While the aforementioned aromatic dicarboxylic acid having sulfonic acid group and the aforementioned aromatic dicarboxylic acid having phosphonic acid group may be singly used respectively, these materials may alternatively be copolymerized thereby synthesizing the inventive polybenzazole compound having sulfonic acid group and/or phosphonic acid group.

While the aforementioned aromatic dicarboxylic acid having sulfonic acid group and the aforementioned aromatic dicarboxylic acid having phosphonic acid group may be used alone, these materials may alternatively be copolymerized with aromatic dicarboxylic acid containing neither sulfonic acid group nor phosphonic acid group thereby synthesizing the inventive polybenzazole compound having sulfonic acid group and/or phosphonic acid group.

<Method of Synthesizing Polybenzazole Compound>

A method of synthesizing the polybenzazole compound having sulfonic acid group and/or phosphonic acid group by employing at least one compound selected from the aforementioned group consisting of aromatic tetramine, aromatic diaminediol, aromatic diaminedithiol and derivatives thereof and at least one compound selected from the group consisting of aromatic dicarboxylic acid and a derivative thereof (both are hereinafter simply referred to as material monomers) is not particularly restricted, but the compound can be synthesized by dehydration and cyclizing polymerization with a solvent of polyphosphoric acid described in J. F. Wolfe, Encyclopedia of Polymer Science and Engineering, $2^{nd}$ Ed., Vol. 11, P. 601 (1988), for example. Further, it is also possible to apply polymerization according to a similar mechanism employing a mixed solvent system of methanesulfonic acid and phosphorus pentoxide in place of polyphosphoric acid. In order to synthesize a polybenzazole compound having high thermal stability, polymerization employing generally used polyphosphoric acid is preferable.

In order to obtain a polybenzimidazole compound as the inventive polybenzazole compound, it is also possible to use a method of synthesizing a precursor polymer having a polyamide structure or the like through reaction in a proper organic solvent or in the form of a mixed material monomer melt and converting the same to a target polyimidazole structure by subsequent cyclization through proper heat treatment or the like, for example.

While the reaction time for synthesizing the inventive polybenzazole compound is not unconditionally definable in consideration of the optimum reaction time depending on combination of the monomers, the thermal stability of the obtained polybenzazole compound may be lowered in a system containing a monomer such as aromatic dicarboxylic acid having sulfonic acid group and/or phosphonic acid group in generally reported reaction over a long time, and the reaction time is preferably reduced in the range capable of attaining the effects of the present invention in this case. A polybenzazole compound having a large quantity of sulfonic acid groups can also be obtained with high thermal stability by reducing the reaction time.

While an optimum reaction temperature for synthesizing the inventive polybenzazole compound is not unconditionally definable because the optimum reaction temperature depends on the combination of monomers, it may be impossible to control the content of sulfonic acid groups and/or phosphonic acid groups in the obtained polybenzazole compound the reaction is carried out at a high temperature as reported in literature and the reaction temperature is preferably lowered in the range capable of attaining the effects of the present invention in this case. Control of the content of sulfonic acid groups and/or phosphonic acid groups in a polybenzazole compound may be possible by reducing the reaction temperature to some extent when the content of these groups is large.

When the inventive polybenzazole compound is a copolymer of these material monomers, the repeating units are bonded to each other by random polymerization and/or alternating polymerization, so that the compound exhibits stable performance as the material for a polymer electrolyte membrane.

In order to synthesize the inventive polybenzazole compound in the form of random copolymer and/or alternating copolymer, it is to charge all the monomers at the same time with equivalent ratios from the initial stage of polymerization.

While the polybenzazole compound can be synthesized not only by random polymerization or alternating polymerization but also by block polymerization, it is preferable to carry out polymerization after synthesizing an oligomer of a first component under charge conditions for monomer materials in compounding ratios displacing equivalence and further adding monomer materials for adjusting the compounding ratios to match equivalence also with reference to a second component.

<Molecular Weight and Inherent Viscosity of Polybenzazole Compound>

While the molecular weight of the inventive polybenzazole compound having sulfonic acid group and/or phosphonic acid group is not particularly restricted, the same is preferably at least 1,000, and more preferably at least 3,000. This molecular weight is preferably not more than 1,000,000, and more preferably not more than 200,000. If this molecular weight is less than 1,000, it is difficult to obtain a molding having excellent properties from the polybenzazole compound due to reduction of viscosity. If this molecular weight exceeds 1,000,000, it is difficult to mold the polybenzazole compound due to increase of the viscosity.

The molecular weight of the inventive polybenzazole compound having sulfonic acid group and/or phosphonic acid group can be substantially evaluated by inherent viscosity measured in concentrated sulfuric acid. This inherent viscosity is preferably at least 0.25, and more preferably at least 0.40 in particular. Further, this inherent viscosity is preferably not more than 10, and more preferably not more than 8 in particular.

If this inherent viscosity is less than 0.25, it is difficult to obtain a molding having excellent properties from the polybenzazole compound due to reduction of the viscosity. If this molecular weight exceeds 10, it is difficult to mold the polybenzazole compound due to increase of the viscosity.

Further, the molecular weight of the inventive polybenzazole compound having sulfonic acid group and/or phosphonic acid group can also be substantially evaluated by inherent viscosity measured in methanesulfonic acid. This inherent viscosity is preferably at least 0.1, and more preferably at least 0.3 in particular. Further, this inherent viscosity is preferably not more than 50, and more preferably not more than 30 in particular.

If this inherent viscosity is less than 0.1, it is difficult to obtain a molding having excellent properties from the polybenzazole compound due to reduction of the viscosity. If this molecular weight exceeds 50, it is difficult to mold the polybenzazole compound due to increase of the viscosity.

<Conductivity of Polybenzazole Compound>

One of the features of the inventive polybenzazole compound having sulfonic acid group and/or phosphonic acid group resides in that the same has excellent ion conductivity, and a polybenzazole compound including an aromatic dicarboxylic acid bond unit having sulfonic acid group (also simply referred to as a polybenzazole compound having sulfonic acid group in this specification) exhibits further excellent ion conductivity in particular.

In addition to the aforementioned basic properties, the conductivity of the inventive polybenzazole compound having sulfonic acid group and/or phosphonic acid group obtained by measuring alternating impedance when applying a voltage of 10,000 Hz in frequency under conditions of 80° C. and 95% RH (hereinafter simply referred to as conductivity) is preferably at least 0.01 S/cm, and more preferably at least 0.02 S/cm if the conductivity is measured by a measuring method described later (the conductivity is hereinafter measured by a similar measuring method). This conductivity is preferably not more than 1.0 S/cm, and more preferably not more than 0.90 S/cm.

If this conductivity is less than 0.01 S/cm, there is such a tendency that sufficient ion conductivity cannot be attained when the compound is used as the material for a solid polymer electrolyte membrane for fuel cells. An excess quantity of sulfonic acid groups and/or sulfonic acid groups must be introduced into the polybenzazole compound so that this conductivity exceeds 1.0 S/cm, and there is such a tendency that sufficient durability cannot be attained when the compound is used as the material for a solid polymer electrolyte membrane for a fuel cell.

<Polybenzazole Compound Having Sulfonic Acid Group>

It is more preferable that the inventive polybenzazole compound includes a benzoxazole bond unit and/or a benzothiazole bond unit and includes an aromatic dicarboxylic acid unit having sulfonic acid group while the conductivity is at least 0.02 S/cm in addition to the aforementioned basic properties. In this case, the inventive polybenzazole compound is more suitably usable as the material for a solid polymer electrolyte membrane for fuel cells.

Further, it is more preferable if the inventive polybenzazole compound includes a benzoxazole bond unit and/or a benzothiazole bond unit and includes an aromatic dicarboxylic acid bond unit having at least one sulfonic acid group in molecules while inherent viscosity measured in a methanesulfonic aid solution is at least 0.1 dl/g and conductivity is at least 0.3 S/cm in addition to the aforementioned basic properties. In this case, the inventive polybenzazole compound is further preferably usable as the material for the solid polymer electrolyte membrane employed for fuel cells.

It is further preferable if the inventive polybenzazole compound includes bond units expressed in the following formulas (1) and (2) in a molar ratio $n^1:(1-n^1)$ as components and the molar ratio satisfies an expression $0.5 \leq n^1 \leq 1.0$ in addition to the aforementioned basic properties. In this case, the inventive polybenzazole compound is more preferably usable as the material for the solid polymer electrolyte membrane for fuel cells. If $n^1$ is less than 0.5 in this case, there is unpreferably such a tendency that the conductivity is reduced:

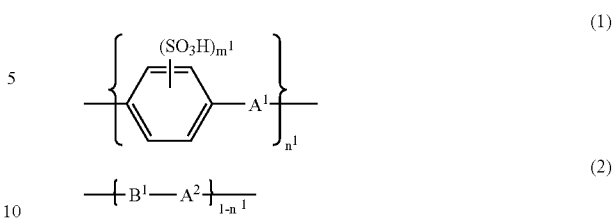

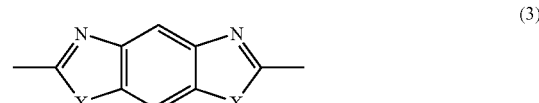

where $m^1$ represents an integer of 1 to 4, $B^1$ represents a bivalent aromatic bond unit and each of $A^1$ and $A^2$ represents a bivalent bond unit expressed in either one of the following formulas (3) and (4) in each of the formulas (1) and (2). $A^1$ and $A^2$ may be identical to or different from each other:

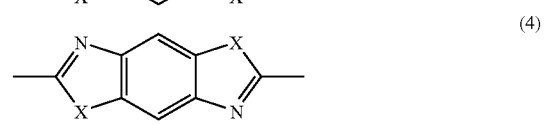

where X represents either S atom or O atom in each of the formulas (3) and (4).

In this case, the sulfonic acid group may be partially in the form of a salt such as an alkaline metal in the formula (1) so far as the conductivity is within the preferable range in the present invention. While the bivalent aromatic bond unit $B^1$ in the formula (1) is not particularly restricted, a p-phenylene group, an m-phenylene group, a naphthalene group, a diphenylene ether group, a diphenylenesulfone group, a biphenylene group, a terphenyl group, a 2,2-bis(4-carboxyphenylene)hexafluoropropane group or the like can be listed, for example.

Among these bivalent aromatic bond units, the p-phenylene group is particularly preferable. Further, $A^1$ and $A^2$ are preferably identical to each other, and more preferably in the structure expressed in the above formula (3).

In addition, it is more preferable if $n^1$ is at least 0.75. Further, it is more preferable if $m^1$ is 1 or 2. When satisfying these conditions, the inventive polybenzazole compound is further preferably usable as the material for the solid polymer electrolyte membrane for fuel cells.

<Polybenzazole Compound Having Phosphonic Acid Group>

The inventive polybenzazole compound is further preferable also, when satisfying such conditions that the same is a polybenzazole compound including an aromatic dicarboxylic acid bond unit having phosphonic acid group as a component (also simply referred to as a polybenzazole compound having phosphonic acid group in this specification) and the conductivity is at least 0.001 S/cm in addition to the aforementioned basic properties. Also in this case, the inventive polybenzazole compound has excellent ion conductivity, and is further preferably usable as the material for the polymer electrolyte membrane for fuel cells.

While the phosphonic acid group introducible into the inventive polybenzazole compound is not particularly restricted in this case, a phosphonic acid group can be introduced into the polybenzazole compound by employing a monomer consisting of aromatic dicarboxylic acid having phosphonic acid such as 2,5-dicarboxyphenylphosphonic acid, 3,5-dicarboxyphenylphosphonic acid, 2,5-bisphosphonoterephthahic acid or the like and a derivative thereof, for example. While the structure of the phosphonic acid group of the polybenzazole compound having the phosphonic acid group is not particularly restricted, the phenylphosphonic acid group type described above is preferable.

The inventive polybenzazole compound having phosphonic acid group is further preferable when the same includes a benzoxazole bond unit as a primary component and includes an aromatic dicarboxylic acid bond unit having phosphonic acid group while the conductivity is at least 0.01 S/cm. In this case, the inventive polybenzazole compound is further preferably usable as the material for the solid polymer electrolyte membrane for fuel cells.

The inventive polybenzazole compound having phosphonic acid group preferably contains no fluorine atom. This is because the inventive polybenzazole compound having a phosphonic acid group can exhibit excellent durability, heat resistance, water resistance and mechanical strength without containing fluorine atoms, and because the production process becomes complex and the cost increases if the compound contains fluorine atoms. Further, there is such a tendency that resistance against methanol is decreased when the compound contains fluorine atoms, leading to a disadvantage for serving as the solid polymer electrolyte membrane for fuel cells. The inventive polybenzazole compound having phosphonic acid group described below similarly preferably contains no fluorine atom.

<Solubility in Organic Solvent>

The inventive polybenzazole compound is further preferable if the same is a polybenzazole compound including polyimidazole bond unit as a component and including aromatic dicarboxylic acid bond unit having sulfonic acid group and/or phosphonic acid group (also simply referred to as a polyimidazole compound having sulfonic acid group and/or phosphonic group acid in this specification) and satisfies such conditions that solubility in N-methylpyrrolidone (also simply abbreviated as NMP in this specification) is at least 5% (w/w) and inherent viscosity measured in concentrated sulfuric acid is at least 0.25 dl/g in addition to the aforementioned basic properties.

Polybenzazole compounds generally have low solubility and may frequently be dissolved only in a strong acidic solvent. When forming a solid polymer electrolyte membrane by a wet method from a strong acidic solution, the membrane structure is so readily heterogenized that it is difficult to prepare a solid polymer electrolyte membrane maintaining stable performance. When the polybenzazole compound is soluble in an organic solvent such as NMP, however, a membrane can be prepared by dry method so that the solid polymer electrolyte membrane which exhibits stable membrane performance over a long period can be readily prepared.

In this case, therefore, the inventive polybenzazole compound having excellent solubility in NMP can be regarded as a polymeric material excellent in moldability and ion conductivity, and is further preferably usable as the material for the solid polymer electrolyte membrane for fuel cells. If the solubility of the inventive polybenzazole compound in NMP is less than 5% (w/w), a large quantity of solvent is required for obtaining a solid polymer electrolyte membrane having a desired thickness and hence homogeneity of the membrane tends to be damaged.

The inventive polybenzazole compound is further remarkably preferable if the same is a polybenzazole compound including a benzoxazole bond unit as a component (also simply referred to as a polybenzoxazole compound in this specification) and includes an aromatic dicarboxylic acid bond unit having at least one sulfonic acid group in molecules while satisfying such conditions that inherent viscosity measured in a methanesulfonic acid solution is at least 0.1 dl/g and solubility in dimethylsulfoxide at 40° C. is at least 1% (w/w) in addition to the aforementioned basic properties.

Dimethylsulfoxide, which can dissolve various substances and is relatively readily removable by drying, is a kind of solvent suitably employed for the processing of polymeric materials. If the inventive polybenzazole compound has solubility in dimethylsulfoxide at least 1% (w/w) under the 40° C. condition, the compound can be slowly dried under a relatively low temperature condition around 40° C. for obtaining a dense and homogeneous solid polymer electrolyte membrane. If the solubility of the inventive polybenzazole compound in dimethylsulfoxide at 40° C. is less than 1% (w/w), a large quantity of solvent is required in order to obtain a solid polymer electrolyte membrane having a desired thickness and hence homogeneity of the membrane tends to be damaged. If the inventive polybenzazole compound is dissolved in dimethylsulfoxide under a temperature condition higher than 40° C., there is an unpreferable tendency that the polybenzazole compound causes decomposition or the like during the dissolution.

The inventive polybenzazole compound is further remarkably preferable when the same includes bond units expressed in the following formulas (5) and (6) in a molar ratio $n^2:(1-n^2)$ as components and the molar ratio satisfies an expression $0.85 \leq n^2 \leq 1.0$ while the compound satisfies such a condition that sulfonic acid groups in the form of alkaline metal salts are not more than 15 mol % among all sulfonic acid groups in addition to the aforementioned basic properties. In this case, the inventive polybenzazole compound exhibits excellent solubility in dimethylsulfoxide, and is further preferably usable as the material for the solid polymer electrolyte membrane for fuel cells:

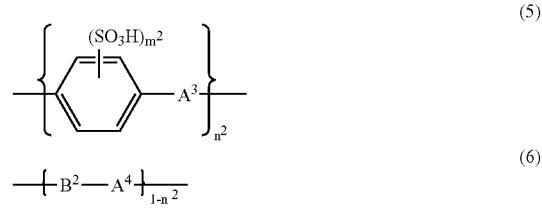

(5)

(6)

where $m^2$ represents an integer of 1 to 4, $B^2$ represents a bivalent aromatic bond unit and each of $A^3$ and $A^4$ represents a bivalent bond unit expressed in either one of the following formulas (7) and (8) in each of the formulas (5) and (6). $A^3$ and $A^4$ may be identical to or different from each other.

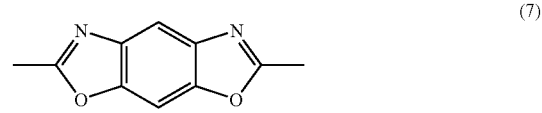

(7)

-continued

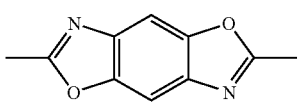
(8)

The inventive polybenzazole compound is further remarkably preferable if the same includes bond units expressed in the following formulas (9) and (10) in a molar ratio $n^3:(1-n^3)$ as components and the molar ratio satisfies an expression $0.85 \leq n^3 \leq 1.0$ while the compound satisfies such a condition that sulfonic acid groups in the form of alkaline metal salts are not more than 10 mol % among all sulfonic acid groups in addition to the aforementioned basic properties. In this case, the inventive polybenzazole compound exhibits excellent solubility in dimethylsulfoxide, and is further preferably usable as the material for the solid polymer electrolyte membrane for fuel cells:

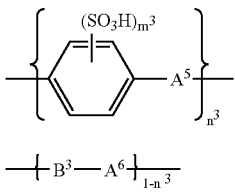
(9)

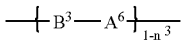
(10)

where $m^3$ represents an integer of 1 to 4, $B^3$ represents a bivalent aromatic bond unit and each of $A^5$ and $A^6$ represents a bivalent bond unit expressed in either one of the following formulas (11) and (12) in each of the formulas (9) and (10). $A^5$ and $A^6$ may be identical to or different from each other.

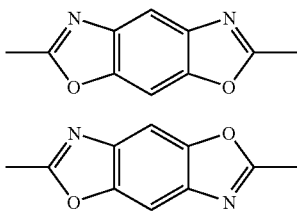
(11)

(12)

In this case, further, the aforementioned polybenzoxazole compound having sulfonic acid group excellent in solubility in dimethylsulfoxide further preferably provides a polybenzazole compound particularly excellent in processability and ion conductivity if the same satisfies such a condition that the conductivity is at least 0.3 S/cm in addition to the aforementioned basic properties.

<Mass Reduction by Water Immersion>

It is further preferable if the inventive polybenzazole compound has at least 1.5 meq/g of sulfonic acid groups and/or phosphonic acid groups in molecules and reduction of mass when immersed in water of 25° C. for 72 hours (also simply referred to as mass reduction by water immersion in this specification) is not more than 5% in addition to the aforementioned basic properties. When mass reduction by water immersion is not more than 5% in the inventive polybenzazole compound, physical properties are not reduced by dissolution or swelling but the compound is further preferably usable as the material for the solid polymer electrolyte membrane for fuel cells.

When the inventive polybenzazole compound contains a low-molecular weight component, it is also useful to previously reprecipitate the inventive polybenzazole compound in water for removing the low-molecular weight component having high water solubility.

The aforementioned polybenzazole compound characterized in that mass reduction by water immersion is small is further preferable if the same includes bond units expressed in the following formulas (13) and (14) in a molar ratio $n^4:(1-n^4)$ as components and the molar ratio satisfies an expression $0.4 \leq n^4 \leq 1.0$ in addition to the aforementioned basic properties. In this case, the inventive polybenzazole compound is particularly excellent in water resistance and further preferably usable as the material for the solid polymer electrolyte membrane for fuel cells:

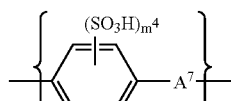
(13)

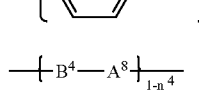
(14)

where $m^4$ represents an integer of 1 to 4, $B^4$ represents a bivalent aromatic bond unit and each of $A^7$ and $A^8$ represents a bivalent bond unit expressed in either one of the following formulas (15) and (16) in each of the formulas (13) and (14). $A^7$ and $A^8$ may be identical to or different from each other:

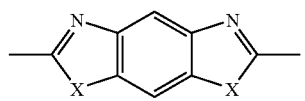
(15)

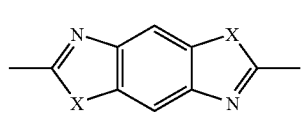
(16)

where X represents either S atom or O atom in each of the formulas (15) and (16).

The aforementioned inventive polybenzazole compound characterized in that mass reduction by water immersion is small is further preferable if the same is a polybenzoxazole and/or polybenzothiazole compound having a sulfonic acid group and satisfies such a condition that the conductivity is at least 0.3 S/cm in addition to the aforementioned basic properties. In this case, as the inventive polybenzazole compound having small mass reduction by water immersion simultaneously shows high conductivity, the same can be regarded as a polybenzazole compound particularly excellent in water resistance and ion conductivity, and is further preferably usable as the material for the solid polymer electrolyte membrane for fuel cells.

The aforementioned inventive polybenzazole compound characterized in that mass reduction by water immersion preferably has at least 1.5 meq/g of sulfonic acid groups in molecules, and more preferably has at least 2.5 meq/g of sulfonic acid groups in molecules in addition to the aforementioned basic properties. In this case, as the inventive polybenzazole compound having small mass reduction by water immersion simultaneously shows high conductivity, the same can be regarded as a polybenzazole compound particularly excellent in water resistance and ion conductivity, and is further preferably usable as the material for the solid polymer electrolyte membrane for fuel cells.

Further, the aforementioned inventive polybenzazole compound characterized in that mass reduction by water immersion is small is further preferable if the same contains at least 2.5 meq/g of sulfonic acid groups and/or phosphonic acid groups in molecules, mass reduction by water immersion at 25° C. is not more than 5% (w/w) and solubility in dimethylsulfoxide under a 40° C. condition is at least 1% (w/w) in addition to the aforementioned basic properties.

In this case, the inventive polybenzazole compound can be regarded as a polybenzazole compound particularly excellent in processability and water resistance, and is further preferably usable as the material for the solid polymer electrolyte membrane for fuel cells. Among such polybenzazole compounds, a polybenzazole compound having at least 2.5 meq/g of sulfonic acid groups in molecules is particularly preferable.

The aforementioned inventive polybenzazole compound having both water resistance and solubility in dimethylsulfoxide is further preferable if the same is the polybenzazole compound according to claim 20 including bond units expressed in the following formulas (17) and (18) in a molar ratio $n^5:(1-n^5)$ as components with the molar ratio satisfying an expression $0.85 \leq n^5 \leq 1.0$ in addition to the aforementioned basic properties. In this case, the inventive polybenzazole compound is particularly excellent in processability and water resistance, and further preferably usable as the material for the solid polymer electrolyte membrane employed for fuel cells:

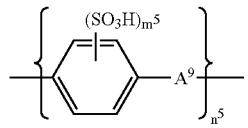   (17)

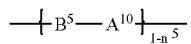   (18)

where $m^5$ represents an integer of 1 to 4, $B^5$ represents a bivalent aromatic bond unit and each of $A^9$ and $A^{10}$ represents a bivalent bond unit expressed in either one of the following formulas (19) and (20) in each of the formulas (17) and (18). $A^9$ and $A^{10}$ may be identical to or different from each other:

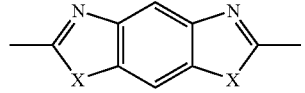   (19)

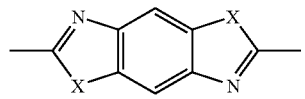   (20)

where X represents either S atom or O atom in each of the formulas (19) and (20).

In relation to the aforementioned inventive polybenzazole compound having both water resistance and solubility in dimethylsulfoxide, a polybenzazole compound having conductivity of at least 0.3 S/cm is a polybenzazole compound exhibiting excellent performance also in ion conductivity in addition to processability and water resistance, and is further preferable.

<Mass Reduction by Heat>

In general, a sulfonic acid group and/or a phosphonic acid group bonded to an aromatic ring readily causes desulfonation and/or dephosphonation by heat. Therefore, an aromatic polymer having sulfonic acid group and/or phosphonic acid group is generally inferior in thermal stability.

While ion conductivity is generally increased as the quantity of sulfonic acid groups and/or phosphonic acid groups contained in the polymer is increased, thermal decomposition starts with elimination of sulfonic acid groups and/or phosphonic acid groups in the polymer having sulfonic acid groups and/or phosphonic acid groups and hence a thermal decomposition temperature is decreased as the quantity of sulfonic acid groups and/or phosphonic acid groups is increased. No technique capable of solving this problem at a satisfactory level has been heretofore disclosed, and obtaining a polymeric material excellent in both ion conductivity and heat resistance capable of forming a material for a solid polymer electrolyte membrane remains as an unsolved subject in this technical field.

On the other hand, the inventive polybenzazole compound having sulfonic acid group and/or phosphonic acid group is excellent in thermal stability. The inventive polybenzazole is further preferable if the conductivity is at least 0.01 S/cm and the temperature at which 3% mass reduction occurs based on the mass at 200° C. in thermogravimetry (also abbreviated as TGA in this specification) (simply referred to as a 3% mass reduction temperature in this specification) is at least 370° C. in addition to the aforementioned basic properties. This 3% mass reduction temperature is further preferably at least 400° C., and most preferably at least 440° C.

In this case, the inventive polybenzazole compound particularly excellent in ion conductivity and heat resistance is further preferably usable as the material for the solid polymer electrolyte membrane for fuel cells, and can be regarded as an answer to the aforementioned problem.

The aforementioned inventive polybenzazole compound excellent in thermal stability is further preferable if the same is polybenzazole having phosphonic acid group and satisfies such a condition that the 3% mass reduction temperature is at least 400° C. in addition to the aforementioned basic properties. This 3% mass reduction temperature is further preferably at least 420° C., and most preferably at least 450° C. Also in this case, the inventive polybenzazole compound particularly excellent in ion conductivity and heat resistance is further preferably usable as the material for the solid polymer electrolyte membrane for fuel cells, and can be regarded as an answer to the aforementioned problem not solved by the prior art.

In relation to the aforementioned polybenzazole compound having phosphonic acid group excellent in thermal stability, a polybenzazole compound having solubility of at least 5% (w/w) in NMP is further preferable. In this case, the inventive polybenzazole compound is particularly excellent also in processability along with durability/stability under a high temperature, and is further preferably usable as the material for the solid polymer electrolyte membrane for fuel cells. It can be said further preferable if this polybenzazole compound is a polybenzimidazole compound in addition to the excellent solubility in NMP.

If the phosphonic acid group-containing polybenzazole compound excellent in durability and processability at high temperatures shows the conductivity at least 0.001 S/cm, the compound is further preferable in the point that the same is excellent also in ion conductivity in addition to durability and processability at high temperatures.

<Polybenzimidazole Compound Having Sulfonic Acid Group>

Among the inventive polybenzazole compounds heretofore described, a polybenzazole compound including bond units expressed in the following formulas (21) and (22) in a molar ratio $n^6:(1-n^6)$ and satisfying an expression $0.2 \leq n^6 \leq 1.0$ in addition to the aforementioned basic properties is most preferable. In this case, the inventive polybenzazole compound is excellent also in solvent resistance and mechanical strength along with durability/stability at high temperatures and is further preferably usable as the material for the solid polymer electrolyte membrane for fuel cells:

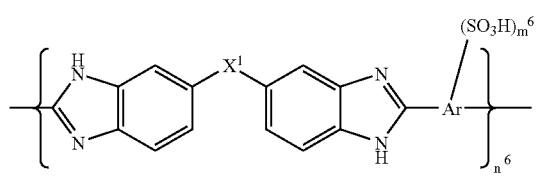

(21)

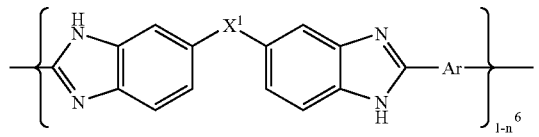

(22)

where $m^6$ represents an integer of 1 to 4, Ar represents an aromatic bond unit, $X^1$ represents at least one selected from a group consisting of —O—, —$SO_2$—, —$C(CH_3)_2$—, —$C(CF_3)_2$— and —OPhO— and Ph represents a bivalent bond unit in each of the formulas (21) and (22).

If $n^6=1.0$, the inventive polybenzazole compound forms a homopolymer that all repeating units contain sulfonic acid groups. In the aforementioned polybenzimidazole compound having sulfonic acid group excellent also in solvent resistance and mechanical strength along with durability/stability at high temperatures, it is difficult to hold high ion conductivity while holding water resistance if $m^6 \geq 4$.

While aromatic tetramines capable of serving as monomers for the benzimidazole bond units having the structures expressed in each of the formulas (21) and (22) is not particularly restricted, 3,3'-4,4'-tetraminodiphenyl ether, 3,3'-4,4'-tetraminodiphenylsulfone, 2,2-bis(3,4-diaminophenyl)propane, 2,2-bis(3,4-diaminophenyl)hexafluoropropane, bis(3,4,-diaminophenoxy)benzene and the like and derivatives thereof can be listed, for example. As specific examples of these derivatives, salts with acid such as hydrochloric acid, sulfuric acid and phosphoric acid can be listed.

While these aromatic tetramines may be singly used, it is also possible to simultaneously use a plurality of such materials. Further, these aromatic teramines may contain a well-known antioxidant such as tin (II) chloride or a phosphorous acid if necessary.

Aromatic dicarboxylic acid having sulfonic acid group capable of forming the monomer for the benzimidazole bond unit having the structure of the formula (21) is not particularly restricted but compounds containing one to four sulfonic acid groups in aromatic dicarboxylic acid can be used.

As specific examples, aromatic dicarboxylic acid having sulfonic acid such as 2,5-dicarboxybenzenesulfonic acid, 3,5-dicarboxybenzenesulfonic acid, 2,5-dicarboxy-1,4-benzenedisulfonic acid, 4,6-dicarboxy-1,3-benzendisulfonic acid and 2,2'-disulfo-4,4'-biphenyldicarboxylic acid and derivatives thereof can be listed. As specific examples of these derivatives, salts with alkaline metal such as of sodium and potassium and an ammonium salt can be listed.

While such aromatic dicarboxyhic acid having sulfonic acid group may be singly employed, it is possible to synthesize the inventive polybenzazole compound by reacting the aromatic dicarboxylic acid with aromatic dicarboxylic acid having no sulfonic acid group capable of forming the monomer for the benzimidazole bond unit having the structure of the formula (22) in the form of copolymerization.

While aromatic dicarboxylic acid having no sulfonic acid group employable for synthesizing the inventive polybenzazole compound along with such aromatic dicarboxylic acid having sulfonic acid group is not particularly restricted, it is possible to use general aromatic dicarboxylic acids reported for the preparation of polyesters such as terephthalic acid, isophthalic acid, naphthalenedicarboxylic acid, diphenyl ether dicarboxylic acid, diphenylsulfonedicarboxylic acid, biphenyldicarboxylic acid, terphenyldicarboxylic acid or 2,2-bis(4-carboxyphenyl)hexafluoropropane, for example.

The purity of aromatic dicarboxylic acid having a sulfonic acid group is not particularly restricted but at least 98% is preferable and at least 99% is more preferable. This is because a polyimidazole compound polymerized from an aromatic dicarboxylic acid having sulfonic acid group exhibits such a tendency that the degree of polymerization is lowered as compared with a case of employing aromatic dicarboxylic acid having no sulfonic acid group and hence it is preferable to employ aromatic dicarboxylic acid having sulfonic acid group with the highest possible purity.

When using aromatic dicarboxylic acid having no sulfonic acid group with aromatic dicarboxylic acid having sulfonic acid group, it is possible to clarify an excellent effect of the inventive polybenzazole compound having a sulfonic acid group for serving as the material used for the solid polymer electrolyte membrane for fuel cells by setting the content of aromatic dicarboxylic acid having a sulfonic acid group to at least 20 mol % in the total aromatic dicarboxylic acid. In order to derive the said effect of the inventive polybenzazole compound having sulfonic acid group in a salient form, it is further preferable to set the content of aromatic dicarboxylic acid having sulfonic acid group to at least 50 mol % in the total aromatic dicarboxylic acid.

It is repeated that the aforementioned inventive polybenzimidazole compound having sulfonic acid group is excellent in durability, solvent resistance and mechanical properties. For example, the molecular weight reduction by hydrolysis in hot water is small, swelling in an acidic aqueous solution is also small, and there is no apprehension of breaking even if the membrane is thin.

<Resin Composition>

Also when the inventive polybenzazole compound having sulfonic acid group and/or phosphonic acid group is singly compounded into a resin composition as a main component, the obtained resin composition is preferably usable as the material for the solid polymer electrolyte membrane for fuel cells. However, the inventive polybenzazole compound having sulfonic acid group and/or phosphonic acid group is not restricted to single use but the obtained resin composition is preferably usable as the material for the solid polymer electrolyte membrane for fuel cells also when the compound is compounded as the main component along with a polybenzazole compound having no ionic group.

It is assumed that the polybenzazole compounds having no ionic group compoundable with the inventive polybenzazole compound having sulfonic acid group and/or phosphonic acid group (also simply referred to as a polybenzazole compound having no ionic group) denotes aromatic polyoxazoles, aromatic polythiazoles, aromatic polyimidazoles, compositions containing the same and copolymers thereof.

In other words, the inventive resin composition contains the inventive polybenzazole compound having sulfonic acid group and/or phosphonic acid group and polybenzazole compound having no ionic group. It is assumed that the inventive resin composition also includes a resin composition consisting of the inventive polybenzazole compound having sulfonic acid group and/or phosphonic acid group alone.

The polybenzazole compound having no ionic group compoundable with the inventive resin composition is generally a polybenzazole compound containing a repeating unit having the structure of the following formula (31) as a component:

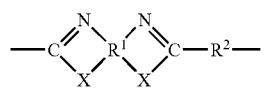
(31)

where $R^1$ represents a quadrivalent aromatic bond unit capable of forming an azole ring, and X represents O atom, S atom or NH group in the formula (31). $R^2$ represents a bivalent aromatic bond unit. Each of $R^1$ and $R^2$ may be a single aromatic ring, several aromatic rings or a fused ring, and may have one or more stable substituent groups. Further, each of $R^1$ and $R^2$ may have a hetero ring structure provided with N atoms, S atoms, O atoms etc. in the aromatic ring thereof.

The polybenzazole compound having no ionic group compoundable into the inventive resin composition can also be presented as a repeating unit having the structure shown in the following formula (32):

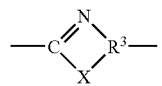
(32)

where X represents O atom, S atom or NH group in the formula (32). $R^3$ represents a trivalent aromatic bond unit capable of forming an azole ring.

The polybenzazole compound having no ionic group compoundable into the inventive resin composition may be a polybenzazole compound containing repeating units consisting of the bond units expressed in both of the formulas (31) and (32).

While the polybenzazole compound having no ionic group compoundable into the inventive resin composition is not particularly restricted, poly{(benz[1,2-d:5,4-d']bisoxazole-2,6-diyl)-1,4-phenylene}, poly{(benz[1,2-d:5,4-d'] bisoxazole-2,6-diyl)-1,4-phenylene}, poly{benz[1,2-d:5,4-d']bisthiazole-2,6-diyl}-1,4-phenylene}, poly{(benz[1,2-d: 4,5-d']bisthiazole-2,6-diyl)-1,4-phenylene}, poly{(benz[1, 2-d:5,4-d']bisimidazole-2,6-diyl)-1,4-phenylene}, poly{benz{1,2-d:4,5-d'}bisimidazole-2,6-diyl}-1,4-phenylene}, poly{2,2'-(p-phenylene)-6,6'-bibenzoxazole}, poly{2,2'-(m-phenylene)-6,6'-bibenzoxazole}, poly{2,2'-(p-phenylene)-6,6'-bibenzthiazole}, poly{2,2'-(m-phenylene)-6,6'-bibenzthiazole}, poly{2,2'-(p-phenylene)-6,6'-bibenzimidazole}, poly{2,2'-(m-phenylene)-6,6'-bibenzimidazole}, poly(2,6-benzoxazole), poly(2,5-benzoxazole), poly(2,6-benzthiazole), poly(2,5-benzthiazole), poly(2,6-benzimidazole), poly(2,5-benzimidazole) and the like can be listed, for example.

Among these compounds, poly{(benz[1,2-d:5,4-d']bisoxazole-2,6-diyl)-1,4-phenylene}, poly{(benz[1,2-d:4,5-d'] bisoxazole-2,6-diyl)-1,4-phenylene}, poly{(benz[1,2-d:5,4-d']bisthiazole-2,6-diyl)-1,4-phenylene}, poly{(benz[1,2-d: 4,5-d']bisthiazole-2,6-diyl)-1,4-phenylene}, poly(2,6-benzoxazole), poly(2,5-benzoxazole), poly(2,6-benzthiazole), poly(2,5-benzthiazole) and the like are particularly preferable for the polybenzazole compounds having no ionic group compoundable into the inventive resin composition.

The degree of polymerization of the polybenzazole compound having no ionic group compoundable into the inventive resin composition is preferably such a degree of polymerization that inherent viscosity measured in methanesulfonic acid is at least 0.5 dl/g, and more preferably such a degree of polymerization that the inherent viscosity is at least 1 dl/g. Further, this degree of polymerization is preferably such a degree of polymerization that the aforementioned inherent viscosity is not more than 50 dl/g, and more preferably such a degree of polymerization that the inherent viscosity is not more than 30 dl/g. Moldability and mechanical properties of the resin composition tend to decrease if the compound has such a degree of polymerization that the aforementioned inherent viscosity is less than 0.5 dl/g, while processability of the resin composition tends to decrease if the compound has such a degree of polymerization that the aforementioned inherent viscosity exceeds 50 dl/g.

The content of the polybenzazole compound having no ionic group in the inventive resin composition is preferably at least 1 mass % with respect to the mass of the overall resin composition, and more preferably at least 10 mass %. This content is preferably not more than 99 mass %, more preferably not more than 50 mass %, and most preferably not more than 30 mass %. Moldability and mechanical properties tend to lower if this content is less than 1 mass %, while target characteristics for serving as a polymer electrolyte tend to lower if this content exceeds 99 mass %.

A well-known arbitrary method can be employed for mixing the inventive polybenzazole compound having sulfonic acid group and/or phosphonic acid group and the polybenzazole compound having no ionic group with each other. While the compounds can be dissolved in a proper solvent and mixed with each other, melted/kneaded or pulverized and mixed with each other, the method is not restricted to these.

Among these mixing methods, the method of dissolving the compounds in a solvent and mixing the same with each other is preferable in consideration of simplicity of preparation steps, the preparation cost and the quality. More specifically, solutions dissolving the compounds may be mixed with each other, or the compounds may be simultaneously mixed with each other and dissolved.

While an aprotic polar solvent such as N,N-dimethylacetamide, N,N-dimethylformamide, dimethylsulfoxide, N-methylpyrrolidone and hexamethylphosphonamide or strong acid such as polyphosphoric acid, methanesulfonic acid, sulfuric acid and trifluoroacetic acid can be employed as the solvent for dissolving the compounds, the solvents are not restricted to these. While these solvents may be singly employed, a plurality of such solvents may be mixed with one another and used in a possible range. Further, a solution prepared by adding Lewis acid such as lithium bromide, lithium chloride or aluminum chloride into an organic solvent may be employed as the solvent system for dissolving the compounds as means for improving solubility of the compounds.

The total concentration of the inventive polybenzazole compound having sulfonic acid group and/or phosphonic acid group and the polybenzazole compound having no ionic group in the aforementioned solution is preferably at least 0.1 mass %, and more preferably at least 0.5 mass %. This total concentration is preferably not more than 30 mass %, and more preferably not more than 5 mass %. Moldability of the resin composition tends to lower if this total concentration is less than 0.1 mass %, while processability of the resin compound tends to lower if this total of the concentrations exceeds 30 mass %.

<Resin Molding>

The inventive resin molding contains the inventive polybenzazole compound having sulfonic acid group and/or phosphonic acid group.

In other words, the inventive resin molding can be prepared by molding a resin composition containing the inventive polybenzazole compound having sulfonic acid group and/or phosphonic acid group or a solution obtained by dissolving the resin composition into the form of fiber or a film by an arbitrary well-known molding method such as extrusion, spinning, rolling or casting.

Among these molding methods, a method of molding the inventive resin composition from a solution obtained by dissolving the same in a proper solvent is preferable. Therefore, the inventive resin molding prepared by molding the inventive resin composition necessarily contains the inventive polybenzazole compound having sulfonic acid group and/or phosphonic acid group.

While a proper solvent can be selected from aprotic polar solvents such as N,N-dimethylacetamide, N,N-dimethylformamide, dimethylsulfoxide, N-methylpyrrolidone and hexamethylphosphonamide or strong acids such as polyphosphoric acid, methanesulfonic acid, sulfuric acid and trifluoroacetic acid as the solvent for dissolving the inventive resin composition, the solvents are not particularly restricted to these.

While these solvents may be singly employed, a plurality of such solvents may be mixed with one another and used in a possible range. Further, a solution prepared by adding Lewis acid such as lithium bromide, lithium chloride or aluminum chloride into an organic solvent may be employed as the solvent system, as means for improving solubility of the inventive resin composition.

The concentration of the inventive resin composition in the solution is preferably at least 0.1 mass %, and more preferably at least 1 mass %. Further, this concentration is preferably not more than 30 mass %, and more preferably not more than 25 mass %. Moldability of the resin molding tends to decrease if this concentration is less than 0.1 mass %, while processability of the resin molding tends to decrease if this concentration exceeds 30 mass %.

Further, a well-known molding method can be employed as the method of obtaining the resin molding from the solution containing the inventive resin composition. For example, the resin molding containing the resin composition containing the polybenzazole compound having sulfonic acid group and/or phosphonic acid group can be obtained by removing the solvent by heating, vacuum drying, immersion in a non-solvent miscible with the solvent dissolving the resin composition but substantially incapable of dissolving the resin composition or the like.

If the solvent for dissolving the inventive resin composition is an organic solvent, it is preferable to distill away the solvent by heating or vacuum drying. If this solvent is strong acid, it is preferable to immerse the same in water, methanol or acetone. At this time, the solution can be molded into fiber or a film in the form of a composite with another resin composition at need. For example, it is convenient to obtain an excellent molding when combining the resin composition with another resin composition containing a polybenzazole compound with similar solubility.

<Solid Polymer Electrolyte Membrane>

The inventive solid polymer electrolyte membrane contains the inventive polybenzazole compound having sulfonic acid group and/or phosphonic acid group.

The inventive polybenzazole compound having sulfonic acid group and/or phosphonic acid group having excellent ion conductivity is suitable for a film or a membrane to be used as an ion exchange membrane for a fuel cell or the like. Therefore, the inventive solid polymer electrolyte membrane is also excellent in ion conductivity and suitably used as an ion exchange membrane for a fuel cell or the like.

The inventive solid polymer electrolyte membrane can be obtained by molding the resin composition containing the inventive polybenzazole compound having sulfonic acid group and/or phosphonic acid group.

A preferable method of preparing a membrane mainly composed of the resin composition containing the inventive polybenzazole compound having sulfonic acid group and/or phosphonic acid group is casting from a solution containing the inventive resin composition. The membrane containing the resin composition containing the polybenzazole compound having sulfonic acid group and/or phosphonic acid group can be obtained by removing the solvent from the cast solution as described above.

In this case, the solvent is preferably removed by drying in view of homogeneity of the membrane. The solvent is preferably dried under a low pressure at the lowest possible temperature, in order to prevent the resin composition and the solvent from decomposition and alteration. A glass plate or a Teflon plate can be employed as a cast substrate. If the solution has high viscosity, the substrate or the solution is heated and cast at high temperature so that the viscosity of the solution is reduced and the solution can be readily cast.

In this case, the thickness of the cast solution (also simply referred to as a cast thickness in this specification) is not particularly restricted but is preferably at least 10 µm, and more preferably at least 100 µm. Further, this thickness is preferably not more than 1000 µm, and more preferably not more than 500 µm. There is such a tendency that the membrane obtained from the cast solution cannot keep its form if this thickness is less than 100 µm, while there is such a tendency that a heterogeneous membrane is readily formed if this thickness exceeds 1000 µm.

Further, a well-known method can be employed for controlling the cast thickness. For example, the cast thickness can be kept constant through an applicator or a doctor blade or the cast area can be kept constant with a glass dish or the like for controlling the cast thickness constant in response to the quantity or the concentration of the solution.

A more homogeneous membrane can be obtained by adjusting the speed for removing the solvent from the solution cast in the aforementioned manner. When heating the solution, for example, the heating temperature may be set low in an initial stage for reducing the evaporation rate. When immersing the solution in a non-solvent such as water, the rate of solidification of the polymer can be adjusted by leaving the solution in the air or inert gas for a proper time or the like.

The inventive solid polymer electrolyte membrane, which can be set to an arbitrary thickness in response to its object, is preferably as thin as possible in consideration of ion conductivity. More specifically, the thickness is preferably not more than 200 μm, more preferably not more than 50 μm, and most preferably not more than 20 μm.

On the other hand, the inventive solid polymer electrolyte membrane, which can be set to an arbitrary thickness in response to its object, is preferably as thick as possible in consideration of mechanical strength. More specifically, the thickness is preferably at least 5 μm, more preferably at least 10 μm, and most preferably at least 20 μm.

The membrane according to the present invention is excellent in durability, solvent resistance and mechanical properties. For example, deterioration under a high temperature is small as the durability, swelling in an acidic aqueous solution is also small as the solvent resistance, and there is no apprehension of breaking or the like in handling of the membrane as the technical properties. Further, the membrane containing the inventive polymer structure as the main component can also be utilized as a paint such as binder resin for preparing an assembly of the inventive ion exchange membrane and an electrode.

<Solid Polymer Electrolyte Membrane/Electrode Assembly>

The resin composition containing the inventive polybenzazole compound having sulfonic acid group and/or phosphonic acid group can be preferably used in an assembly of a solid polymer electrolyte and electrode catalytic layers formed by a solid electrolyte membrane and the electrode catalytic layers bonded to both surfaces thereof as a component of the solid polymer electrolyte membrane/electrode assembly.

At this time, the inventive polybenzazole compound having sulfonic acid group and/or phosphonic acid group preferably has at least 1.5 meq/g of sulfonic acid groups and/or phosphonic groups in molecules in view of ion conductivity, and particularly preferably has at least 2.5 meq/g of sulfonic acid groups and/or phosphonic groups.

The feature of the inventive polymer electrolyte membrane/electrode assembly resides in that the solid polyelectrolytic membrane and/or the electrode catalytic layers contain the inventive polybenzazole compound having sulfonic acid group and/or phosphonic acid group.

In the inventive polymer electrolyte membrane/electrode assembly, both of the solid polymer electrolyte membrane and the electrode catalytic layers are preferably mainly composed of the inventive polybenzazole compound having sulfonic acid group and/or phosphonic acid group.

In the inventive polymer electrolyte membrane/electrode assembly, it is more preferable if a binder bonding the solid polymer electrolyte membrane and the electrode catalytic layers to each other contains the inventive polybenzazole compound having sulfonic acid group and/or phosphonic acid group.

Inherent viscosity of the aforementioned binder containing the inventive polybenzazole compound having sulfonic acid group and/or phosphonic acid group in methanesulfonic acid is preferably at least 0.1 dl/g, and more preferably at least 0.3 dl/g. This inherent viscosity is preferably not more than 30 dl/g, and more preferably not more than 25 dl/g.

In the inventive polymer electrolyte membrane/electrode assembly, conventional perfluorocarbonsulfonic acid polyelectrolytes such as "Nafion (registered trademark)" by Du Pont, "Dow Membrane" by Dow Chemical, "Flemion (registered trademark" by Asahi Glass Co., Ltd., "Aciplex (registered trademark)" by Asahi Chemical Industry Co., Ltd., "Gore Select (registered trademark)" by Gore-Tex or the like or polymer electrolytes containing sulfonated polyethersulfones or sulfonated polyether ketones, polybenzimidazole impregnated with strong acid such as phosphoric acid or sulfuric acid or the inventive polybenzazole compound having sulfonic acid group and/or phosphonic acid group can be preferably used as the solid polymer electrolyte membrane. Further, a solid polymer electrolyte membrane containing a plurality of such polymer electrolyte can also be employed as the polymer electrolyte membrane in the range not remarkably damaging ion conductivity.

A solid polymer electrolyte membrane prepared by mixing a polymer other than the inventive polybenzazole compound having sulfonic acid group and/or phosphonic acid group may also be employed as the polymer electrolyte membrane employed for the inventive polymer electrolyte membrane/electrode assembly. A polyazole polymer having excellent compatibility is preferable as the mixed polymer.

The polymer electrolyte membrane employed in the inventive polymer electrolyte membrane/electrode assembly can be obtained by dissolving a resin composition containing various types of polyelectrolytes in a solution, casting the mixture and thereafter removing a solvent by drying or immersing the mixture in a non-solvent, or by a well-known arbitrary molding method of molding such a solution or resin composition by thermal pressing, rolling or extrusion.

The thickness of the solid polymer electrolyte membrane employed in the inventive polymer electrolyte membrane/electrode assembly is preferably at least 5 μm, and more preferably at least 10 μm. Further, this thickness is preferably not more than 300 μm, and more preferably not more than 100 μm.

When molding the solid polymer electrolyte membrane employed in the inventive polymer electrolyte membrane/electrode assembly, it is preferable to dissolve the resin composition containing the inventive polybenzazole compound having sulfonic acid group and/or phosphonic acid group in a solvent for molding the same.

In this case, the solvent suitable for dissolving the resin composition containing the inventive polybenzazole compound having sulfonic acid group and/or phosphonic acid group is not particularly restricted but an aprotic polar solvent such as dimethylsulfoxide, N-methylpyrrolidone, dimethylformamide, dimethylacetamide or hexamethylphosphonamide, a nitrated compound such as nitromethane or nitrobenzene to which Lewis acid such as aluminum chloride, lithium chloride or lithium bromide is added or strong acid such as polyphosphoric acid, sulfuric acid, methanesulfonic acid, ethanesulfonic acid, chlorosulfonic acid or trifluoroacetic acid can be listed, for example. While these solvents can be singly used, a plurality of such solvents may be mixed with each other and used in the range not exerting bad influence on the characteristics of the solid polymer electrolyte membrane employed in the inventive polymer electrolyte membrane/electrode assembly.

Among these solvents, the aprotic polar solvent such as dimethylacetamide is preferable. Further, Lewis acid such as aluminum chloride, lithium chloride or lithium bromide may be added to the aprotic polar solvent, in order to improve solubility of the polymer and stability of the solution. When the content of sulfonic acid groups and/or phosphonic acid groups in the inventive polybenzoxazole or polybenzthiazole having sulfonic acid group and/or phosphonic acid group is large, solubility in the aprotic polar solvent is more preferably improved.

The inventive polymer electrolyte membrane/electrode assembly can be obtained by hot-pressing a catalytic metal and a binder to a solid polymer electrolyte membrane or holding the said solid polymer electrolyte membrane between materials obtained by spraying or applying a polymer electrolyte such as the inventive polybenzazole compound having sulfonic acid group and/or phosphonic acid group to commercially available gas-diffusion electrodes for impregnating the former with the latter and jointing the same to each other.

The inventive polymer electrolyte membrane/electrode assembly can also be obtained by holding a solid polymer electrolyte membrane between materials prepared by stacking paste prepared by homogeneously dispersing the said polymer electrolyte and a catalyst in a solvent on resin films of Teflon, polypropylene, polyethylene or polyethylene terephthalate by repeating application and drying while directing catalytic layers inward, and jointing these materials by hot pressing.

Further, the inventive polymer electrolyte membrane/electrode assembly can also be obtained by applying the said paste prepared by homogeneously dispersing the polymer electrolyte and the catalyst in the solvent to the solid polymer electrolyte membrane with a brush, a paint brush or an applicator or by a method such as spraying or printing and thereafter drying the solvent for jointing the materials. The assembly can also be obtained by jointing electrode materials such as carbon paper and a polymer electrolyte membrane to each other with such paste. These methods may be carried out with an ionic group as an alkaline metallic salt such as Na and thereafter returning the same to the original acid by acid treatment after jointing. It is also possible to directly joint the catalyst to the solid polymer electrolyte membrane by sputtering or the like.

When employing the inventive polybenzazole compound having sulfonic acid group and/or phosphonic acid group as the polymer electrolyte, the said solvent can be used. In this case, the concentration of the polymer electrolyte in the solvent or the paste is preferably at least 0.1 mass %, and more preferably at least 1 mass %. Further, this concentration is preferably not more than 30 mass %, and more preferably not more than 20 mass %.

In the inventive polymer electrolyte membrane/electrode assembly, a conductive material carrying fine particles of the catalytic metal is preferable as the catalyst employed for the electrode catalytic layers, and may contain another component. This catalytic metal is preferably a noble metal mainly composed of platinum, and may include another metal such as rhodium, palladium, gold, silver, iridium or ruthenium.

The particle diameter of this catalyst is preferably at least 1 nm, and more preferably at least 5 nm. The particle diameter of this catalyst is preferably not more than 50 nm, and more preferably not more than 30 nm.

In the electrode catalytic layers employed for the inventive polymer electrolyte membrane/electrode assembly, the quantity of the catalyst with respect to the polymer electrolyte is preferably at least 50 mass %, and more preferably at least 70 mass %. The quantity of this catalyst is preferably not more than 1,000 mass %, and more preferably not more than 500 mass %.

Another component in the electrode catalytic layers employed for the inventive polymer electrolyte membrane/electrode assembly is not particularly restricted but polytetrafluoroethylene, tetrafluoroethylene-perfluoroalkylvinyl ether copolymer, tetrafluoroethylene-hexafluoroethylene copolymer or the like can be listed as a binder, for example.

While proper hot pressing conditions for molding the electrode catalytic layers employed for the inventive polymer electrolyte membrane/electrode assembly can be selected depending on the used materials, the temperature of hot pressing is preferably at least 100° C. and more preferably at least 150° C., in order to attain excellent moldability. Further, the temperature of hot pressing is preferably not more than 300° C., and more preferably not more than 250° C. The pressure of hot pressing is preferably at least 1 MPa, and more preferably at least 2 MPa. Further, the pressure of hot pressing is preferably not more than 10 MPa, and more preferably not more than 7 MPa.

EXAMPLES

While the present invention is described in more detail in Examples, the present invention is not restricted to these.

In this specification, various types of measurements and evaluation tests were carried out as follows:

(i) Measurement of Inherent Viscosity in Concentrated Sulfuric Acid

A sample polymer was dissolved in concentrated sulfuric acid at a concentration of 0.5 g/dl, and viscosity was measured in a thermostat of 30° C. with an Ostwald viscometer for obtaining the inherent viscosity $[\ln(ta/tb)]/c$ (ta represents the fall time (sec.) of a sample solution, tb represents the fall time (sec.) of a solvent and C represents the polymer concentration (g/dl)).

(ii) Measurement of Inherent Viscosity of Solution in Methanesulfonic Acid

A sample polymer was dissolved in methanesulfonic acid at 0.05 g/dl and viscosity was measured with an Ubbelohde viscometer under a condition of 25° C. The inherent viscosity was calculated with the formula described above.

(iii) Measurement of Ion Conductivity

Platinum wires (diameter: 0.2 mm) were pressed against the surface of a strip sample on an own-made measuring probe (made of Teflon) and the sample was held in a thermo-hygrostat oven (Nagano Science Equipment Mfg. Co., Ltd., LH-20-01) under conditions of 80° C. and 95% RH for measuring complex impedance between the platinum wires at 10 KHz with 1250 FREQUENCY RESPONSE ANALYSER by SOLARTRON. Measurement was performed while varying the distance between wires for calculating conductivity by canceling contact resistance between a membrane and the platinum wires from a slope plotting the measured value of resistance against the wire distance through the following equation:

conductivity $[S/cm]=1/$membrane width $[cm]\times$membrane thickness $[cm]\times$resistance slope $[\Omega/cm]$ (iv) Measurement of Solubility in N-Methylpyrrolidone 10.00 g of N-methylpyrrolidone and 0.50 g of a sample polymer were introduced into a 50 ml of flask, stirred in an oil bath at 170° C. under a nitrogen atmosphere for 3 hours, and filtrated through a glass filter of 1G2. Solubility was determined as at least 5% when no residue was visually recognized on the filter.

(v) Measurement of Solubility in Dimethylsulfoxide 10.00 g of dimethylsulfoxide and 0.10 g of a sample polymer were introduced into a 50 ml of flask, stirred in an oil bath at 40° C. under a nitrogen atmosphere for 3 days, and filtrated through a glass filter of 1G2. Solubility was determined as at least 1% when no residue was visually recognized on the filter.

(vi) Measurement of Mass Reduction by Water Immersion 100 mg of a sample polymer was immersed in 10 ml of ion exchanged water at 25° C. for 3 days, and a residue was filtrated through a glass filter of 1G2. After the filtration, the filter was vacuum-dried at 80° C. overnight for obtaining the mass of the residue from the mass difference before and after the filtration.

(vii) Evaluation of Hot Water Resistance

A membrane sample was immersed in boiling water for 1 hour, for visually determining whether the form of the membrane was changed by swelling or dissolution or not.

(viii) Evaluation of Durability

A sample polymer was immersed in water of 100° C. in an ample and left for 3 days. The inherent viscosity was measured for the samples before and after the treatment in the aforementioned manner. Durability was evaluated from change of the measured value of the inherent viscosity.

(ix) Measurement of 3% Mass Reduction Temperature with TGA

Measurement with TGA was carried out with about 5 mg of a polymer having sulfonic acid group and/or phosphonic acid group substantially free from salt form under an argon atmosphere with TGA-50 by Shimadzu Corporation. The temperature was increased up to 150° C. at 10° C./min., thereafter the sample was held for 30 minutes to remove moisture from the same, and measurement was further carried out up to 600° C. at a heating rate of 10° C./min. When the mass of the sample was reduced by 3% with reference to the sample mass upon heating to 200° C., the current temperature was defined as the 3% mass reduction temperature.

(x) Measurement of IR Spectrum

The IR spectrum of a sample polymer was measured with a spectrometer FTS-40 by Biorad and a microscope UMA-300A by Biorad.

Example 1

First, 1.500 g ($5.389 \times 10^{-3}$ mol) of 3,3',4,4'-tetraminodiphenylsulfone, 1.445 g ($5.389 \times 10^{-3}$ mol) of 2,5-dicarboxybenzenesulfonic acid monosodium salt (abbreviation: STA, purity: 99%), 20.48 g (0.1082 mol as phosphorus pentoxide) of polyphosphoric acid (phosphorus pentoxide content: 75 mass %) and 16.41 g (0.1156 mol) of phosphorus pentoxide were charged in a polymerization vessel.

Then, nitrogen was fed into the polymerization vessel, and the reaction mixture were slowly stirred on an oil bath and heated to 100° C. Then, the materials were held at 100° C. for 1 hour, thereafter heated to 150° C. and polymerized for 1 hour, and heated to 200° C. and polymerized for 4 hours. After completing the polymerization, the mixture was allowed to cool, poured into water, and the polymer obtained was repeatedly rinsed in a blender until pH test paper was neutralized. The polymer obtained was vacuum-dried at 80° C. overnight.

The resulting polymer exhibited inherent viscosity of 1.35 dl/g in concentrated sulfuric acid. FIG. 1 shows a result of measurement of the IR spectrum of the polymer. It is understood from the result of the IR spectrum shown in FIG. 1 that this is polybenzimidazole containing sulfonic acid groups according to the present invention.

Then, 400 mg of the polymer was mixed with 4 ml of NMP and the mixture was stirred and heated to 170° C. on an oil bath to be dissolved. The obtained solution was cast onto a glass plate on a hot plate with a thickness of about 200 μm, and NMP was evaporated. The film obtained was peeled from the glass plate, vacuum-dried at 80° C. overnight and thereafter immersed in acetone thereby removing the solvent and employed for the measurement of ion conductivity.

Figure 2:
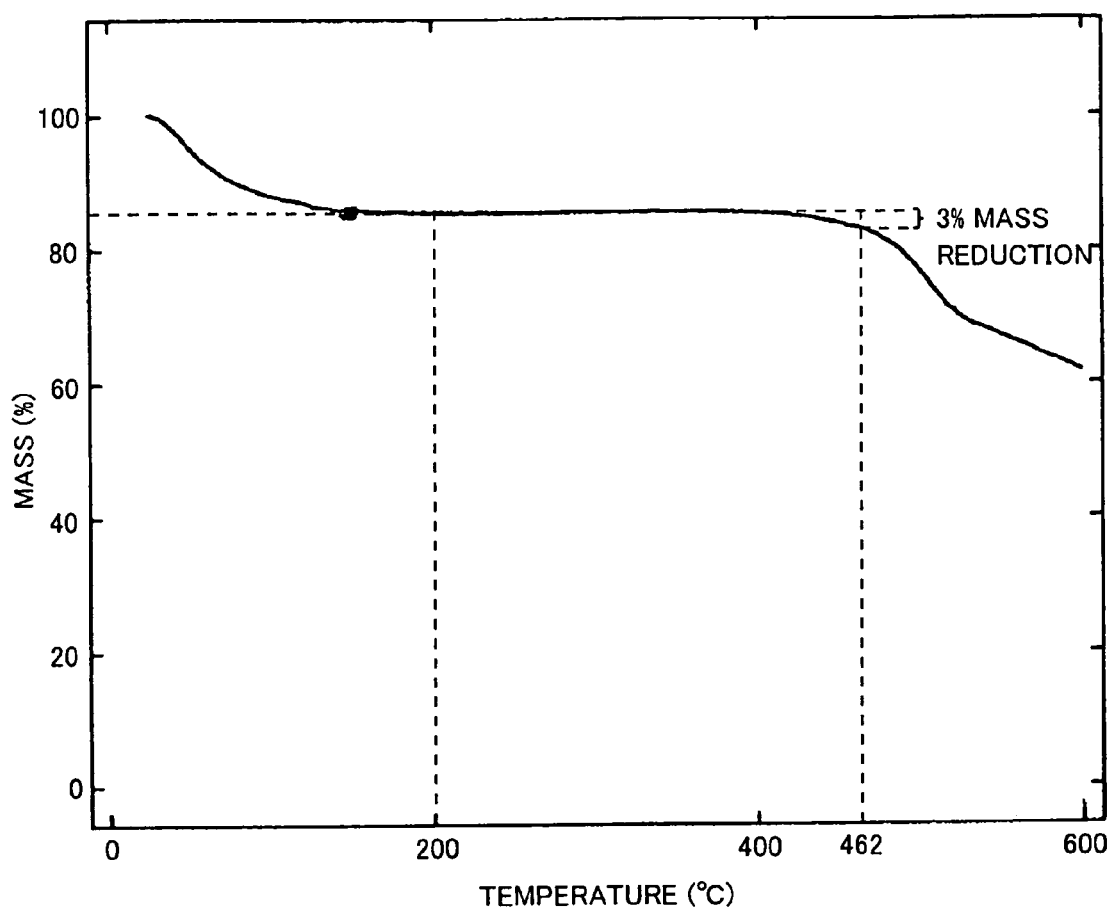
FIG. 2 is a diagram showing the TGA chart of a membrane consisting of the polybenzimidazole compound having sulfonic acid groups synthesized from TAS and STA.

Then, the obtained membrane was subjected to TGA measurement. FIG. 2 shows the chart of TGA measurement obtained at this time. It is understood from the result shown in FIG. 2 that the 3% mass reduction temperature is 462° C.

The obtained membrane exhibited ion conductivity of 0.018 S/cm under conditions of 80° C. and 95% RH, and the measured ion conductivity kept stable performance over a long period. While the obtained membrane was immersed in boiling water for 1 hour, no change of the shape was recognized. Inherent viscosity measured after immersing the membrane in water of 100° C. for 3 days was 1.37 dl/g, and no change from that before the treatment was recognized. In addition, even if a thin membrane of about 10 μm in thickness was prepared, the membrane was not broken in the aforementioned various evaluation tests.

Table 1 shows the results of the aforementioned various measurements.

TABLE 1

| Polymer Composition (Molar ratio) | | Polymer Performance | | | Membrane Performance | |
|---|---|---|---|---|---|---|
| TPA | STA | Inherent Viscosity*1 (dl/g) | Durability (dl/g)*2 | 3% Mass Reduction Temperature (° C.) | Ion Conductivity [S/cm] | Hot Water Resistance*3 |
| 50 | 50 | 1.35 | 1.37 | 462 | 0.018 | no change |

*1 inherent viscosity measured in concentrated sulfuric acid
*2 inherent viscosity after immersion/storage in hot water
*3 visual evaluation after immersion in hot water Example 2

A polymer was prepared by polymerization similarly to Example 1 except that STA and terephthalic acid (abbreviation: TPA) were employed in place of STA with varying the mixing ratio for attaining $5.389 \times 10^{-3}$ mol in total, for preparing a membrane and performing various measurement tests and various evaluation tests.

As a result of the various measurements, ion conductivity kept stable performance over a long period in every sample, and the shape of the membrane was also excellently maintained. Also, even if a thin membrane of about 10 μm in thickness was prepared, the membrane was not broken in the aforementioned various evaluation tests. Table 2 shows results of the various measurements.

TABLE 2

| Polymer Composition (molar ratio) | | Polymer Performance | | | Membrane Performance | |
|---|---|---|---|---|---|---|
| | | Inherent Viscosity*1 | Durability | 3% Mass Reduction Temperature | Ion Conductivity | Hot Water Resistance*3 |
| TPA | STA | (dl/g) | (dl/g)*2 | (° C.) | [S/cm] | tance*3 |
| 34 | 66 | 1.33 | 1.29 | 478 | 0.015 | no change |
| 66 | 34 | 1.42 | 1.42 | 485 | 0.002 | no change |

*1inherent viscosity measured in concentrated sulfuric acid
*2inherent viscosity after immersion/storage in hot water
*3visual evaluation after immersion in hot water Example 3

A polymer was prepared by polymerization similarly to Example 1 except that 3,5-dicarboxybenzenesulfonic monosodium (abbreviation: SIA, purity: 98%) was employed in place of STA, for preparing a membrane and performing various measurements and various evaluations.

Figure 3:
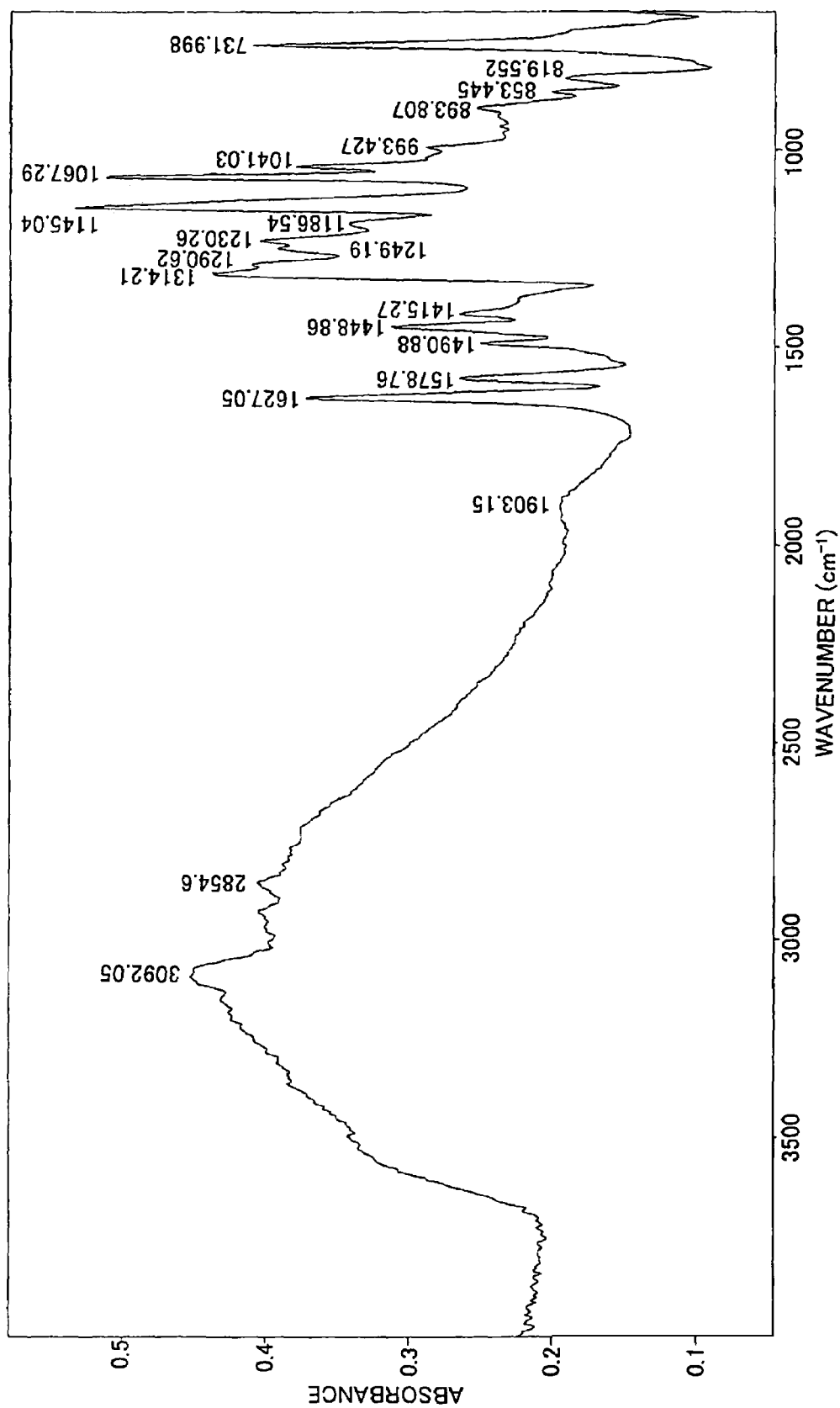
FIG. 3 is a diagram showing the IR spectrum of a polybenzimidazole compound having sulfonic acid groups synthesized in composition of TAS and TPA/SIA=66/34.

FIG. 3 shows the IR spectrum of the obtained polymer measured when adjusting the charging ratio to TPA/SIA=66/34. It is understood from the result of the IR spectrum shown in FIG. 3 that this is polybenzimidazole containing sulfonic acid groups according to the present invention.

As a result of the various measurements, ion conductivity kept stable performance over a long period in every sample, and the shape of the membrane was also excellently maintained. Also, when a thin membrane of about 10 μm in thickness was prepared, the membrane was not broken in the aforementioned various evaluations. Table 3 shows results of the various measurements.

TABLE 3

| Polymer Composition (molar ratio) | | Polymer Performance | | | Membrane Performance | |
|---|---|---|---|---|---|---|
| | | Inherent Viscosity*1 | Durability | 3% Mass Reduction Temperature | Ion Conductivity | Hot Water Resistance*3 |
| TPA | SIA | (dl/g) | (dl/g)*2 | (° C.) | [S/cm] | tance*3 |
| 0 | 100 | 2.11 | 2.09 | 466 | 0.012 | no change |
| 34 | 66 | 1.09 | 1.07 | 417 | 0.0046 | no change |
| 66 | 34 | 1.46 | 1.41 | 432 | 0.0024 | no change |

*1inherent viscosity measured in concentrated sulfuric acid
*2inherent viscosity after immersion/storage in hot water
*3visual evaluation after immersion in hot water Example 4

A polymer was prepared by polymerization similarly to Example 3 except that tin (II) chloride 1 mol % with respect to TAS, was added in the polymerization, for preparing a membrane and performing various measurements.

As a result of the various measurements, ion conductivity kept stable performance over a long period in every sample, and the shape of the membrane was also excellently maintained. Also, when a thin membrane of about 10 μm in thickness was prepared, the membrane was not broken in the aforementioned various evaluations. Table 4 shows results of the various measurements.

TABLE 4

| Polymer Composition (molar ratio) | | Polymer Performance | | | Membrane Performance | |
|---|---|---|---|---|---|---|
| | | Inherent Viscosity*1 | Durability | 3% Mass Reduction Temperature | Ion Conductivity | Hot Water Resistance*3 |
| TPA | SIA | (dl/g) | (dl/g)*2 | (° C.) | [S/cm] | tance*3 |
| 34 | 66 | 1.22 | 1.23 | 422 | 0.0041 | no change |
| 66 | 34 | 1.48 | 1.46 | 429 | 0.0031 | no change |

*1inherent viscosity measured in concentrated sulfuric acid
*2inherent viscosity after immersion/storage in hot water
*3visual evaluation after immersion in hot water Comparative Example 1

A polymer was prepared by polymerization similarly to Example 1 except that polymerization was performed with 0.895 g (corresponding to $5.39 \times 10^{-3}$ mol) of TPA in place of STA, for preparing a membrane and performing various measurements.

As a result of the various measurements, a polymer having inherent viscosity of 2.11 dl/g in sulfuric acid was obtained. No change of the shape was recognized when the obtained membrane was immersed in boiling water for 1 hour, while inherent viscosity after immersing the membrane in water of 100° C. for 3 days was 2.06 and no change from that before the treatment was recognized. While ion conductivity was measured under conditions of 80° C. and 95% RH, it was substantially impossible to capture the ion conductivity. Also, when a thin membrane of about 10 μm in thickness was prepared, the membrane was not broken in the aforementioned various evaluation tests. Table 5 shows results of the various measurements.

TABLE 5

| Polymer Composition (molar ratio) | | Polymer Performance | | | Membrane Performance | |
|---|---|---|---|---|---|---|
| | | Inherent Viscosity*1 | Durability | 3% Mass Reduction Temperature | Ion Conductivity | Hot Water Resistance*3 |
| TSA | TPA | (dl/g) | (dl/g)*2 | (° C.) | [S/cm] | tance*3 |
| 50 | 50 | 2.11 | 2.06 | 548 | below measurement limit | no change |

*1inherent viscosity measured in concentrated sulfuric acid
*2inherent viscosity after immersion/storage in hot water
*3visual evaluation after immersion in hot water Example 5

A polymer was prepared by polymerization similarly to Example 1 except that 1.05 g ($3.773 \times 10^{-3}$ mol) of TAS and 0.598 g ($3.557 \times 10^{-3}$ mol) of TPA were polymerized, thereafter the polymerized liquid was temporarily cooled, and 0.45 g ($1.616 \times 10^{-3}$ mol) of TAS and 0.491 g ($1.832 \times 10^{-3}$ mol) of STA were further added for performing polymerization again and synthesizing a block copolymer satisfying the ratio TPA/STA=66/34, for preparing a membrane and performing various measurements.

Inherent viscosity of the obtained polymer in concentrated sulfuric acid was 0.86 dl/g and it was possible to prepare the membrane by a method similar to that in Example 1, while ion conductivity under conditions of 80° C. and 95% RH was 0.0003 S/cm, i.e., smaller by one order as compared with the polymer of Example 2 having the same copolymerization ratio. Also when a thin membrane of about 10 μm in thickness was prepared, the membrane was not broken in the aforementioned various evaluations. Table 6 shows results of the various measurements.

TABLE 6

| Polymer Composition (molar ratio) | | Polymer Performance | | Membrane Performance | | |
|---|---|---|---|---|---|---|
| | | Inherent Viscosity*1 | 3% Mass Reduction Temperature | Durability*2 | Ion Conductivity | Hot Water Resistance*3 |
| TPA | STA | (dl/g) | (dl/g)*2 | (° C.) | [S/cm] | tance*3 |
| 66 | 34 | 0.86 | 0.84 | 461 | 0.0003 | no change |

*1 inherent viscosity measured in concentrated sulfuric acid
*2 inherent viscosity after immersion/storage in hot water
*3 visual evaluation after immersion in hot water Example 6

Figure 4:
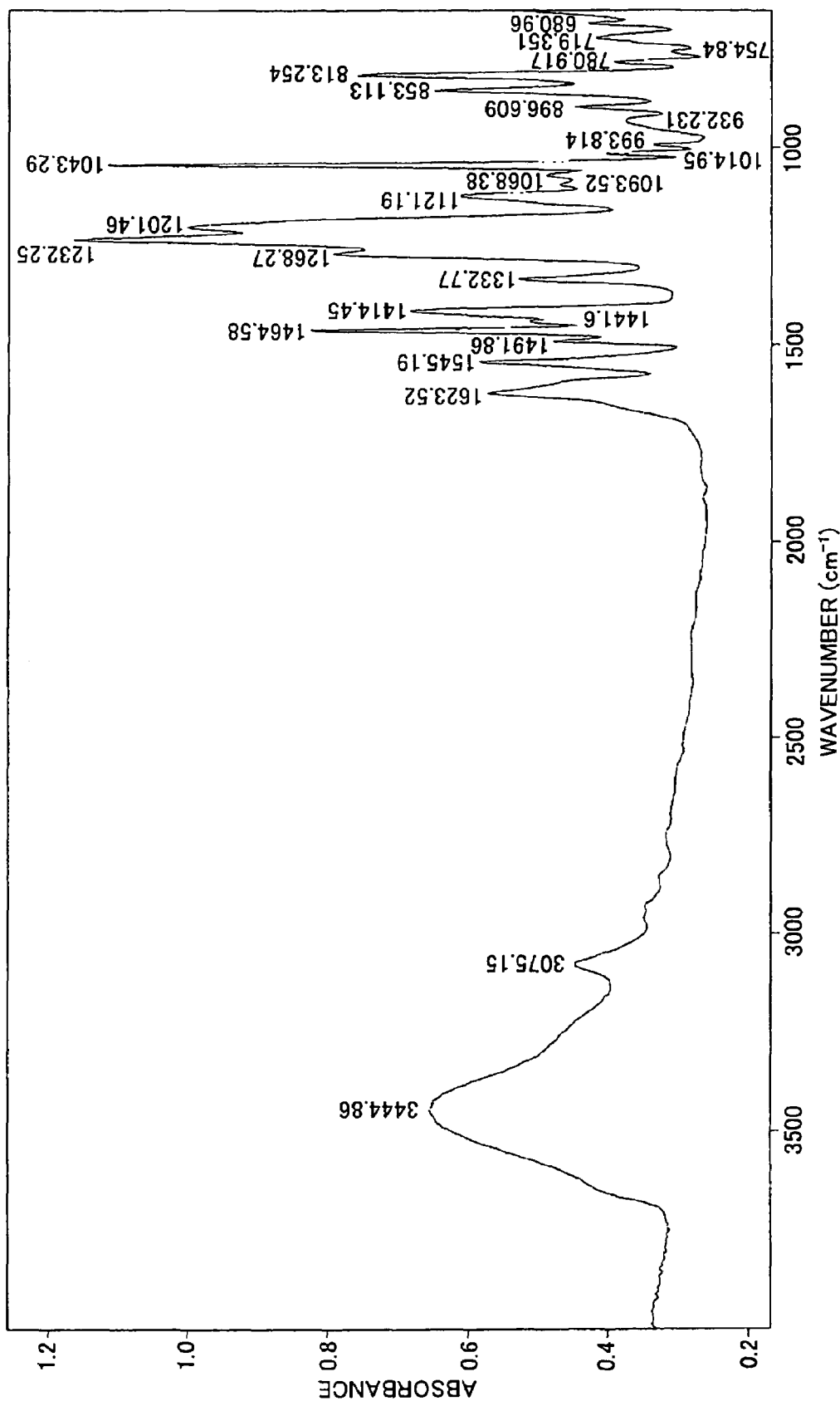
FIG. 4 is a diagram showing the IR spectrum of a polybenzimidazole compound having sulfonic acid groups synthesized in composition of HAB and TPA/SIA=34/66.

Various types of polymers were synthesized by polymerization similarly to Example 1 except that 3,3'-dihydroxybenzidine (abbreviation: HAB) was employed in place of TAS and an aromatic dicarboxylic acid component was prepared from STA or SIA. FIG. 4 shows the IR spectrum of the polymer at TPA/SIA=34/66. It is understood from the result of the IR spectrum shown in FIG. 4 that this is a polybenzoxazole containing sulfonic acid groups according to the present invention.

Then, 1.8 g of methanesulfonic acid was mixed with 0.12 g of the synthesized polymer, and stirred with a magnetic stirrer for several hours to obtain a solution, and further stirred for several hours with addition of 3 g of a 1% (w/w) methanesulfonic acid dope of poly{(benzo[1,2-d:5,4-d'] bisoxazole-2,6-diyl)-1,4-phenylene} (intrinsic viscosity: 24 dl/g) for preparing a homogeneous solution.

The solution obtained was cast onto a glass plate on a hot plate with a thickness of about 225 μm and left at the room temperature for 1 hour, and the glass plate was thereafter immersed in water. Thereafter the water immersion was continued for several days while the water was exchanged by fresh water several times. After the immersion, the film was taken out and air-dried with fixing the periphery of film to avoid shrinkage. Finally, the film was dried by a vacuum oven at 80° C. overnight, thereby preparing a membrane employed for ion conductivity measurement.

As a result of various measurements of the obtained polymers and the membranes, ion conductivity kept stable performance over a long period, and the shapes of the membranes were also excellently maintained. Also even if a thin membrane of about 10 μm in thickness was prepared, the membrane was not broken in the aforementioned evaluation tests. Table 7 shows results of the various measurements.

TABLE 7

| Polymer Composition (molar ratio) | | | Polymer Performance | | Membrane Performance |
|---|---|---|---|---|---|
| | | | Inherent Viscosity*1 | 3% Mass Reduction Temperature | Ion Conductivity |
| TPA | SIA | STA | (dl/g) | (° C.) | [S/cm] |
| 0 | 100 | 0 | 0.60 | 404 | 0.10 |
| 34 | 66 | 0 | 0.82 | 401 | 0.048 |
| 66 | 34 | 0 | 0.98 | 424 | 0.013 |
| 0 | 0 | 100 | 0.88 | 393 | 0.12 |
| 34 | 0 | 66 | 0.51 | 398 | 0.071 |
| 66 | 0 | 34 | 0.56 | 409 | 0.028 |

*1 inherent viscosity measured in concentrated sulfuric acid

Example 7

9.063 g ($4.254 \times 10^{-2}$ mol) of 4,6-diaminoresorcinol dihydrochloride (abbreviation: DAR), 11.408 g ($4.254 \times 10^{-2}$ mol) of 2,5-dicarboxybenzensulfonic acid monosodium salt (abbreviation: STA), 43.86 g (corresponding to 0.2596 mol as phosphorus pentoxide) of polyphosphoric acid (phosphorus pentoxide content: 84 mass %) and 14.49 g (0.01021 mol) of phosphorus pentoxide were weighed in a 200 ml glass separable flask and heated in an oil bath while stirring the same under a nitrogen flow at 70° C. for 0.5 hours, at 120° C. for 5 hours, at 135° C. for 19 hours, at 165° C. for 18 hours and then at 190° C. for 7 hours. A black-green stringy dope was obtained. The obtained dope was poured into ion exchanged water and rinsed until pH test paper was neutralized. The polymer obtained was vacuum-dried at 80° C. overnight.

Figure 5:
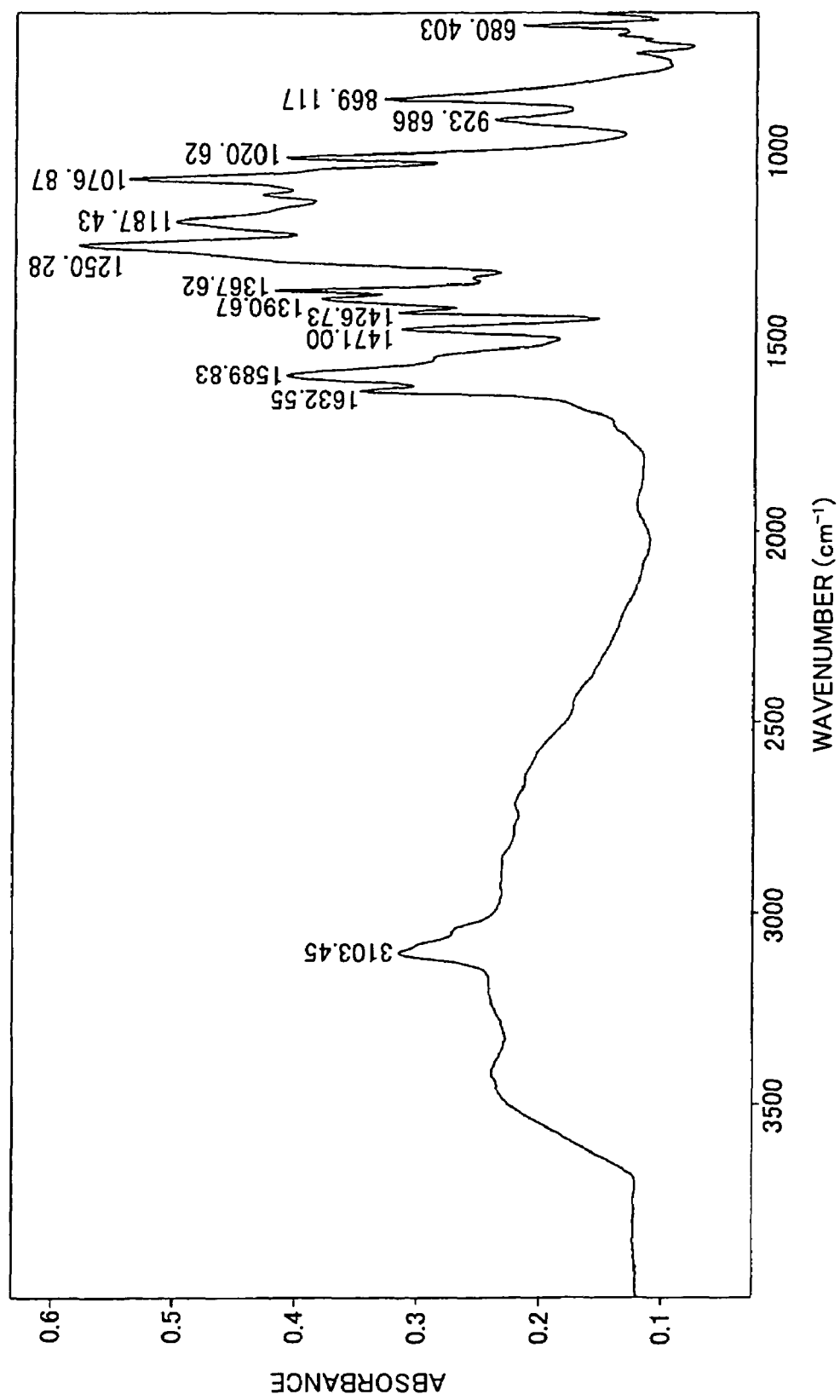
FIG. 5 is a diagram showing the IR spectrum of a polybenzazole compound having sulfonic acid groups synthesized from DAR and STA.

FIG. 5 shows the IR spectrum of the obtained polymer. It is understood from the IR spectrum shown in FIG. 5 that this is polybenzoxazole containing sulfonic acid groups according to the present invention.

Then, 0.165 g of the obtained polymer was stirred and dissolved in 7 ml of dimethylsulfoxide at the room temperature overnight. Then, the obtained solution was cast onto a glass plate with a thickness of about 350 μm, and vacuum-dried at 40° C. overnight and then at 80° C. for two days. Thereafter the glass plate was immersed in water to separate a membrane, and vacuum-dried overnight at 80° C. to give a membrane employed for ion conductivity measurement.

As a result of performing various measurements on the obtained membrane, the polymer exhibited inherent viscosity of 1.72 dl/g in a methanesulfonic acid solution. The ionic group content of the polymer was 3.2 meq/g. No insoluble part was recognized on a glass filter with the solubility test in dimethylsulfoxide. Weight reduction by water immersion was 2.3 mass %.

As a result of performing various measurements on the obtained membrane, the obtained membrane was transparent, had a uniform thickness and was also strong. The membrane exhibited ion conductivity of 0.75 S/cm under conditions of 80° C. and 95% RH, and the ion conductivity kept stable performance over a long period while the shape of the membrane was also excellently maintained. Also when a thin membrane of about 10 μm in thickness was prepared, the membrane was not broken in the aforementioned various evaluation tests. Table 8 shows results of the various measurements.

TABLE 8

| Polymer Composition (molar ratio) | | Polymer Performance | | | | Membrane Performance |
|---|---|---|---|---|---|---|
| | | Inherent Viscosity*1 | Ionic Group Content | Mass Reduction by Water Immersion | Solubility in Dimethyl- | Ion Conductivity |
| DAR | STA | (dl/g) | meq/g | (mass %) | sulfoxide | [S/cm] |
| 50 | 50 | 1.72 | 3.2 | 2.3 | over 1% | 0.75 |

*1 inherent viscosity measured in methanesulfonic acid solution

Example 8

Polymerization was performed similarly to Example 1 except that 10.267 (3.828×10$^{-2}$ mol) of STA and 0.707 g (4.254×10$^{-2}$ mol) of terephthalic acid (abbreviation: TPA) were employed in place of 11.408 g (4.254×10$^{-2}$ mol) of STA, for obtaining a deep-green stringy dope. Further, a polymer and a membrane employed for measuring ion conductivity were prepared from the obtained dope similarly to Example 7.

Measurements and evaluations of the polymer obtained gave the results as follows. Inherent viscosity of the obtained polymer in a methanesulfonic acid solution was 1.77 dl/g. The ionic group content of the polymer was 3.1 meq/g. No insoluble matter was recognized on a glass filter with the solubility test of the obtained polymer in dimethylsulfoxide. Mass reduction of the obtained polymer by water immersion was 2.3%.

Various measurements and evaluations of the obtained membrane gave the results as follows. The membrane exhibited ion conductivity of 0.72 S/cm under conditions of 80° C. and 95% RH, and the measured ion conductivity kept stable performance over a long period while the shape of the membrane was also excellently maintained. Also when a thin membrane of about 10 μm in thickness was prepared, the membrane was not broken in the aforementioned various evaluation tests. Table 9 shows results of the various measurement tests and the evaluation tests.

TABLE 9

| Polymer Composition (molar ratio) | | Polymer Performance | | | | Membrane Performance |
|---|---|---|---|---|---|---|
| | | Inherent Viscosity*1 | Ionic Group Content | Mass Reduction by Water Immersion | Solubility in Dimethyl- | Ion Conductivity |
| STA | TPA | (dl/g) | meq/g | (mass %) | sulfoxide | [S/cm] |
| 90 | 10 | 1.77 | 3.1 | 2.3 | over 1% | 0.72 |

*1 inherent viscosity measured in methanesulfonic acid solution

Example 9

Polymerization was performed similarly to Example 7 except that 7.605 g (2.836×10$^{-2}$ mol) of STA and 2.356 g (1.418×10$^{-2}$ mol) of terephthalic acid (abbreviation: TPA) were employed in place of 11.408 g (4.254×10$^{-2}$ mol) of STA, for obtaining a deep-green stringy dope. Small portion of the obtained dope was poured into ion exchange water, and repeatedly rinsed until pH test paper was neutralized. The polymer obtained was vacuum-dried at 80° C. overnight.

2.00 g of a 1 mass % polyphosphoric acid solution (phosphorus pentoxide content: 84%) of poly{(benzo[1,2-d:5,4-d']bisoxazole-2,6-diyl)-1,4-phenylene} having intrinsic viscosity of 20 dl/g at 25° C. in a methanesulfonic add solution was added to the remaining part of the aforementioned dope, and the mixture was further stirred under the room temperature for obtaining a homogeneous solution. Then, the obtained solution was cast onto a glass plate with a thickness of about 300 μm and kept for 10 minutes, and the glass plate was thereafter immersed in water. Thereafter water immersion was continued for several days while exchanging the water with fresh one several times. After the immersion, a membrane was taken out and air-dried while fixing the periphery of film to avoid shrinkage. Finally, the membrane was dried with a vacuum oven at 80° C. overnight, and a membrane employed for ion conductivity measurement was obtained.

Measurements and evaluations for the obtained polymer gave the results as follows. Inherent viscosity in a methanesulfonic acid solution measured by dissolving 0.08 g of the obtained polymer in 2.0 ml of methanesulfonic acid under the room temperature was 1.95 dl/g.

Measurements and evaluations for the obtained membrane gave the results as follows. The obtained membrane exhibited ion conductivity of 0.37 S/cm under conditions of 80° C. and 95% RH and the measured ion conductivity kept stable performance over a long period, while the shape of the membrane was also excellently maintained. Also when a thin membrane of about 10 μm in thickness was prepared, the membrane was not broken in the aforementioned various evaluation tests. Table 10 shows results of the measurements.

TABLE 10

| Polymer Composition (molar ratio) | | Polymer Performance | | | Membrane Performance |
|---|---|---|---|---|---|
| | | Inherent Viscosity*1 | Ionic Group Content | Mass Reduction by Water Immersion | Ion Conductivity |
| STA | TPA | (dl/g) | meq/g | (mass %) | [S/cm] |
| 67 | 33 | 1.95 | 1.8 | 0.6 | 0.37 |

*1 inherent viscosity measured in methanesulfonic acid solution

Example 10

Polymerization was carried out similarly to Example 7 except that 4.734 g (2.850×10$^{-2}$ mol) of TPA and 3.765 g (1.404×10$^{-2}$ mol) of STA were employed in place of 11.408 g (4.254×10$^{-2}$ mol) of STA, for obtaining a deep-green stringy dope. Small portion of the obtained dope was introduced into ion exchange water, and repeatedly rinsed until pH test paper was neutralized. The obtained polymer was vacuum-dried at 80° C. overnight.

0.230 g of the obtained polymer was stirred and dissolved in 5 ml of methanesulfonic acid under the room temperature overnight. Then, the obtained solution was cast onto a glass plate with a thickness of about 300 μm and kept for 10 minutes, and the glass plate was thereafter immersed in water. Thereafter water immersion was continued for several days while exchanging the water with fresh one several times. After the immersion, a membrane was taken out and air-dried while fixing the periphery of film to avoid shrinkage. Finally, the membrane was dried with a vacuum oven at 80° C. overnight, and a membrane employed for ion conductivity measurement was obtained.

Measurements and evaluations for the obtained polymer gave the results as follows. Inherent viscosity of the polymer in a methanesulfonic acid solution was 6.48 dl/g.

Measurements and evaluations for the obtained membrane gave the results as follows. The membrane exhibited ion conductivity of 0.11 S/cm under conditions of 80° C. and 95% RH and the measured ion conductivity kept stable performance over a long period, while the shape of the membrane was also excellently maintained. Also when a thin membrane of about 10 μm in thickness was prepared, the membrane was not broken in the aforementioned various evaluation tests. Table 11 shows results of the various measurement tests and the evaluation tests.

TABLE 11

| Polymer Composition (molar ratio) | | Polymer Performance | | | Membrane Performance |
|---|---|---|---|---|---|
| | | Inherent Viscosity*1 | Ionic Group Content | Mass Reduction by Water Immersion (mass %) | Ion Conductivity |
| STA | TPA | (dl/g) | meq/g | | [S/cm] |
| 33 | 67 | 6.48 | 1.2 | 0.1 | 0.11 |

*1 inherent viscosity measured in methanesulfonic acid solution

Example 11

First, 1.830 g (6.575×10⁻³ mol) of 3,3'-4,4'-tetraminodiphenylsulfone (abbreviation: TAS), 1.618 g (6.575×10⁻³ mol) of 3,5-dicarboxyphenylphosphonic acid (abbreviation: DCP, purity: 98%), 20.48 g of polyphosphoric acid (phosphorus pentoxide content: 75 mass %) and 16.41 g of phosphorus pentoxide were weighed and sampled into a polymerization vessel.

Then, nitrogen was fed into the polymerization vessel and the materials were slowly stirred on an oil bath and heated to 110° C. Then, the reaction mixture was held at 110° C. for 1 hour, thereafter heated to 150° C. and polymerized for 1 hour, and heated to 200° C. and polymerized for 5 hours. After completion of the polymerization, the system was allowed to cool, and the polymer was taken out with addition of water and repeatedly rinsed in a blender until pH test paper was neutralized. The obtained polymer was vacuum-dried at 80° C. overnight.

Figure 6:
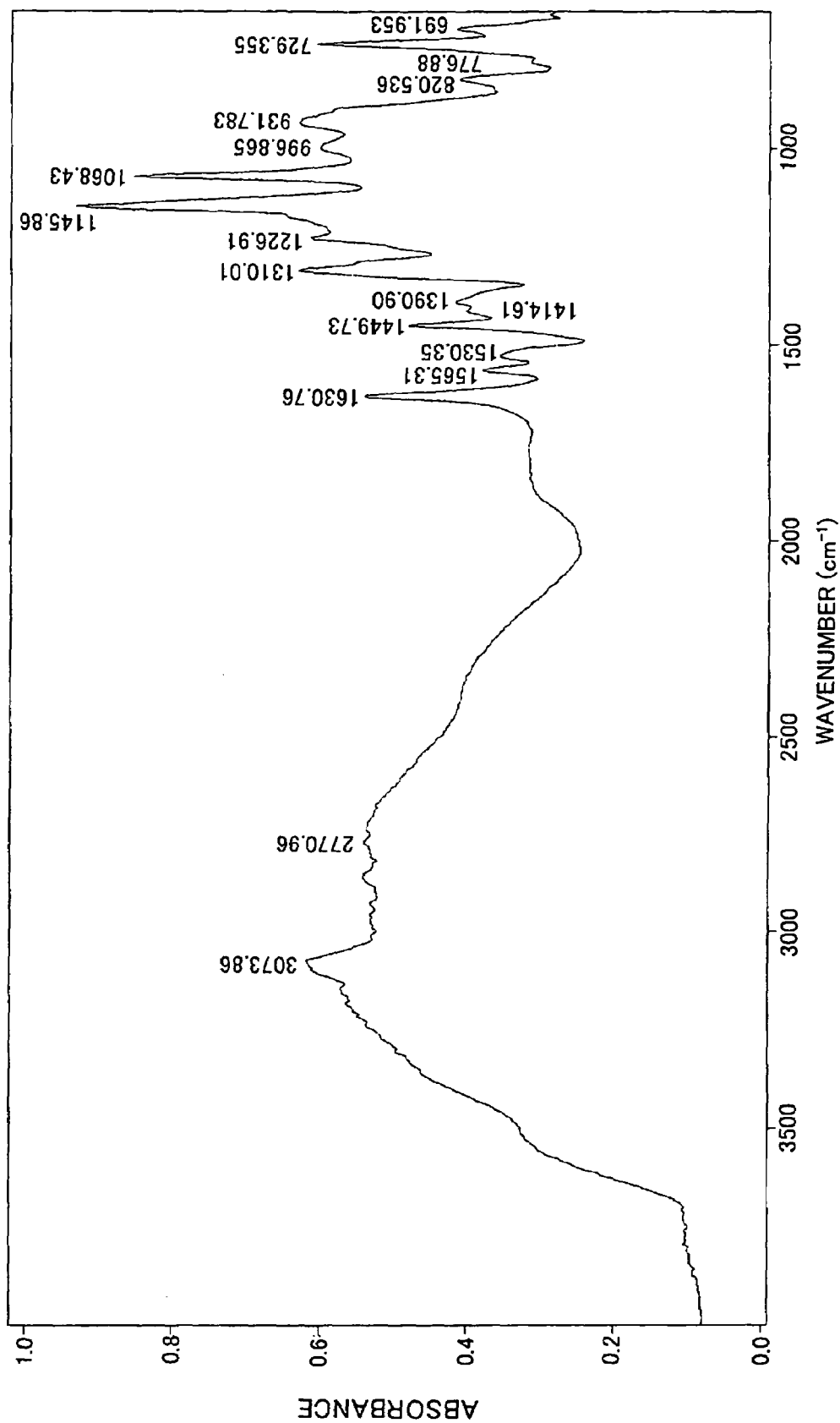
FIG. 6 is a diagram showing the IR spectrum of a polybenzimidazole compound having phosphonic acid groups synthesized from TAS and DCP.

FIG. 6 shows the IR spectrum of the obtained polymer. It is understood from the IR spectrum shown in FIG. 6 that this is polybenzimidazole containing phosphonic acid groups according to the present invention.

300 mg of the obtained polymer and 2.5 ml of methanesulfonic acid were mixed under the room temperature and stirred for obtaining a homogeneous solution. The obtained solution was cast onto a glass plate on a hot plate with a thickness of about 200 μm and kept at the room temperature for 1 hour, and the glass plate was thereafter immersed in water. Thereafter water immersion was continued for several days while exchanging the water with fresh one several times. After the immersion, the film was taken out and air-dried while fixing the periphery of film to avoid shrinkage. Finally, the film was dried with a vacuum oven at 80° C. overnight, and a membrane employed for ion conductivity measurement was obtained.

Measurements and evaluations for the obtained membrane gave the results as follows. Inherent viscosity measured in concentrated sulfuric acid was 1.21 dl/g, and a 3% mass reduction temperature by TGA measurement was 440° C.

Measurements and evaluations for the obtained membrane gave the results as follows. The membrane exhibited ion conductivity of 0.031 S/cm under conditions of 80° C. and 95% RH and the measured ion conductivity kept stable performance over a long period, while the shape of the membrane was also excellently maintained. Also when a thin membrane of about 10 μm in thickness was prepared, the membrane was not broken in the aforementioned various evaluation tests. Table 12 shows results of the various measurements.

TABLE 12

| Polymer Composition (molar ratio) | | Polymer Performance | | | Membrane Performance | |
|---|---|---|---|---|---|---|
| | | Inherent Viscosity*1 | Durability | 3% Mass Reduction Temperature | Ion Conductivity | Hot Water Resistance*3 |
| TAS | DCP | (dl/g) | (dl/g)*2 | (° C.) | [S/cm] | |
| 50 | 50 | 1.21 | 1.19 | 440 | 0.031 | no change |

*1 inherent viscosity measured in concentrated sulfuric acid
*2 inherent viscosity after immersion/storage in hot water
*3 visual evaluation after immersion in hot water Example 12

Polymerization was performed similarly to Example 10 except that DCP and terephthalic acid (abbreviation: TPA) were employed in place of STA while varying the mixing ratio for attaining 6.575×10⁻³ mol in total.

Then, 400 mg of the obtained polymer and 4 ml of NMP were mixed, stirred and heated to 170° C. on an oil bath to be dissolved. Then, the mixture was cast onto a glass plate on a hot plate with a thickness of about 200 μm, and NMP was evaporated. A membrane was separated from the glass plate, vacuum-dried at 800° C. overnight and thereafter immersed in acetone to remove the solvent.

In the various measurements and evaluations for the obtained polymers and the membranes, ion conductivity of the obtained membranes kept stable performance over a long period, and the shapes of the membranes were also excellently maintained. Also even if a thin membrane of about 10 μm in thickness was prepared, the membrane was not broken in the aforementioned various evaluation tests. Table 13 shows results of the various measurements and evaluations.

TABLE 13

| Polymer Composition (molar ratio) | | Polymer Performance | | | Membrane Performance | |
|---|---|---|---|---|---|---|
| | | Inherent Viscosity*1 | Durability | 3% Mass Reduction Temperature | Ion Conductivity | Hot Water Resistance*3 |
| TPA | DCP | (dl/g) | (dl/g)*2 | (° C.) | [S/cm] | |
| 17 | 83 | 1.21 | 1.20 | 431 | 0.018 | no change |
| 34 | 66 | 1.05 | 1.01 | 433 | 0.012 | no change |
| 66 | 34 | 1.03 | 1.01 | 418 | 0.0024 | no change |

*1 inherent viscosity measured in concentrated sulfuric acid
*2 inherent viscosity after immersion/storage in hot water
*3 visual evaluation after immersion in hot water

Example 13

Polymerization was carried out similarly to Example 1 with 1.830 g ($4.997 \times 10^{-3}$ mol) of 2,2-bis(3-amino-4-hydroxyphenyl)hexafluoropropane (abbreviation: 6FAO) and 1.339 g ($4.996 \times 10^{-3}$ mol) of STA for preparing a membrane and performing measurements and evaluations.

The obtained polymer showed inherent viscosity of the obtained polymer in concentrated sulfuric acid was 0.88, and the 3% mass reduction temperature was 359° C. in TGA measurement.

Measurements and evaluations for the obtained polymer and the membrane gave the results as follows. Ion conductivity of the obtained membrane kept stable performance over a long period, and the shape of the membrane was also excellently maintained. Also when a thin membrane of about 10 μm in thickness was prepared, the membrane was not broken in the aforementioned various evaluation tests. Table 14 shows results of the measurements.

TABLE 14

| Polymer Composition (molar ratio) | | Polymer Performance | | Membrane Performance |
|---|---|---|---|---|
| | | Inherent Viscosity | 3% Mass Reduction | Ion Conductivity |
| 6FAO | STA | *1 (dl/g) | Temperature (° C.) | [S/cm] |
| 50 | 50 | 0.88 | 359 | 0.07 |

*1 inherent viscosity measured in concentrated sulfuric acid
*2 inherent viscosity after immersion/storage in hot water
*3 visual evaluation after immersion in hot water

Example 14

0.2 g of a sulfonated polybenzoxazole compound, i.e., the polymer obtained in Example 6, was dissolved in 20 ml of dimethylsulfoxide under the room temperature, and the mixture was poured into a glass dish of 9 cm in diameter and vacuum-dried. After the drying, the mixture was immersed in water, and a membrane was separated and dried for obtaining a solid polymer electrolyte membrane having a thickness of 16 μm.

Then, 0.72 g of carbon black (particle diameter: 20 to 30 nm) having a platinum carrying quantity of 20% (w/w) and 1 g of Nafion (registered trademark) solution (by Du Pont: "20% of a Nafion (registered trademark) solution") were mixed and dispersed uniformly in 5 g of glycerin, thereby the paste was prepared.

The obtained paste was sprayed on one surface of the solid polymer electrolyte membrane and vacuum-dried. The paste was similarly applied to the other surface of the solid polymer electrolyte membrane and vacuum-dried.

The platinum carrying quantity of the membrane/electrode assembly obtained was 0.5 mg/cm$^2$. Conductivity of this membrane/electrode assembly was $8.6 \times 10^{-4}$ S/cm.

Example 15

0.2 g of the sulfonated polybenzoxazole obtained in Example 6, was dissolved in 20 ml of dimethylsulfoxide at a room temperature. Then, 0.72 g of carbon black (particle diameter: 20 to 30 nm) having a platinum carrying quantity of 20% (w/w) was mixed and dispersed uniformly, thereby the paste was prepared.

The obtained paste was applied by screen printing to one surface of a solid polymer electrolyte membrane prepared similarly to that in Example 13, and vacuum-dried. The paste was similarly applied also to the other surface of the solid polymer electrolyte membrane and vacuum dried.

The platinum carrying quantity of the membrane/electrode assembly obtained was 0.5 mg/cm$^2$. Conductivity of this membrane/electrode assembly was $1.3 \times 10^{-3}$ S/cm.

Example 16

First, 4,4'-biphenyldicarboxylic acid was stirred with 30% fuming sulfuric acid at 120° C., thereby synthesizing 2,2'-disulfo-4,4'-biphenyldicarboxylic acid (abbreviation: DSBC). Then, the reactive solution was treated with sodium hydroxide, for purifying DSBC having sulfonic acid groups in the form of sodium salts.

Then, a polymer was prepared by polymerization similarly to Example 1 except that 2.405 g ($5.389 \times 10^{-3}$ mol) of DSBC purified as described above was employed in place of STA, for preparing a membrane and performing measurements.

As a result of the various measurements, ion conductivity kept stable performance over a long period in every sample, and the form of the membrane was also excellently maintained. Also when a thin membrane of about 10 μm in thickness was prepared, the membrane was not broken in the aforementioned various evaluation tests. Table 15 shows results of measurements.

TABLE 15

| Polymer Composition (molar ratio) | | Polymer Performance | | | Membrane Performance | |
|---|---|---|---|---|---|---|
| | | Inherent Viscosity*1 | Durability | 3% Mass Reduction Temperature | Ion Conductivity | Hot Water Resistance*3 |
| TAS | DSBC | (dl/g) | (dl/g)*2 | (° C.) | [S/cm] | tance*3 |
| 50 | 50 | 0.87 | 0.85 | 395 | 0.022 | no change |

*1 inherent viscosity measured in concentrated sulfuric acid
*2 inherent viscosity after immersion/storage in hot water
*3 visual evaluation after immersion in hot water Embodiments and Examples disclosed this time must be considered as illustrative in all points and not restrictive. The scope of the present invention is shown not by the above description but by the scope of claim for patent, and it is intended that all modifications within the meaning and range equivalent to the scope of claim for patent are included.

INDUSTRIAL AVAILABILITY

The inventive polybenzazole compound having sulfonic acid group and/or phosphonic acid group, which is a compound prepared by introducing sulfonic acid group and/or phosphonic acid group into a polybenzazole compound having excellent properties in view of processability, solvent resistance, durability, heat resistance and mechanical properties, is excellent not only in processability, solvent resistance, durability, heat resistance and mechanical properties but also in ion conductivity. Therefore, the inventive polybenzazole compound having sulfonic acid group and/or phosphonic acid group is preferably usable as a polymeric material for a solid polymer electrolyte membrane.

Further, the resin composition containing the inventive polybenzazole compound having sulfonic acid group and/or phosphonic acid group, also excellent not only in processability, solvent resistance, durability, heat resistance and mechanical properties but also in ion conductivity, is preferably usable as a polymeric material for a solid polymer electrolyte membrane used in fuels cells or the like.

In addition, the resin molding containing the inventive polybenzazole compound having sulfonic acid group and/or phosphonic acid group, also excellent not only in processability, solvent resistance, durability, heat resistance and mechanical properties but also in ion conductivity; is preferably usable as a polymeric material for a solid polymer electrolyte membrane used in fuel cells or the like. Further, the solid polymer electrolyte membrane containing the inventive polybenzazole compound having sulfonic acid group and/or phosphonic acid group, also excellent not only in processability, solvent resistance, durability, heat resistance and mechanical properties but also in ion conductivity, is preferably usable as a primary member of a fuel cell or the like.

The inventive membrane/electrode assembly is a composite including a solid polymer electrolyte membrane and electrode catalytic layers bonded to both surfaces of this solid polymer electrolyte membrane as components, and the solid polymer electrolyte membrane and/or the electrode catalytic layers contain the inventive polybenzazole compound having sulfonic acid group and/or phosphonic acid group as the component, whereby the composite is excellent not only in processability, solvent resistance, durability, heat resistance and mechanical properties but also in ion conductivity and is preferably usable as a primary member of a fuel cell or the like.

In addition, a membrane/electrolyte assembly including a solid polymer electrolyte membrane and electrode catalytic layers bonded to both surfaces of this solid polymer electrolyte membrane as the membrane/electrode assembly containing the inventive polybenzazole compound having sulfonic acid group and/or phosphonic acid group as the component can be obtained also by the inventive method of preparing a membrane/electrode assembly, and this membrane/electrode assembly, excellent not only in processability, solvent resistance, durability, heat resistance and mechanical properties but also in ion conductivity, is preferably usable as a primary member of a fuel cell or the like.

The invention claimed is:

1. A polybenzazole compound including an aromatic dicarboxylic acid bond unit having sulfonic acid group and optionally phosphonic acid group and satisfying either a condition that inherent viscosity measured in concentrated sulfuric acid is in the range of 0.25 to 10 dl/g or a condition that inherent viscosity measured in a methanesulfonic acid solution is in the range of 0.1 to 50 dl/g, wherein conductivity obtained by measuring complex impedance when applying a voltage of 10,000 Hz in frequency under conditions of 80° C. and 95% RH is in the range of 0.001 to 1.0 S/cm if said aromatic dicarboxylic acid bond unit contains phosphonic acid group and conductivity obtained by measuring complex impedance when applying a voltage of 10,000 Hz in frequency under conditions of 80° C. and 95% RH is in the range of 0.01 to 1.0 S/cm if said aromatic dicarboxylic acid bond unit contains no phosphonic acid group, and said polybenzazole compound including bond units consisting of components expressed in the following formulas (1) and (2) in a molar ratio $n^1:(1-n^1)$, said molar ratio satisfying an expression $0.5 \leq n^1 \leq 1.0$:

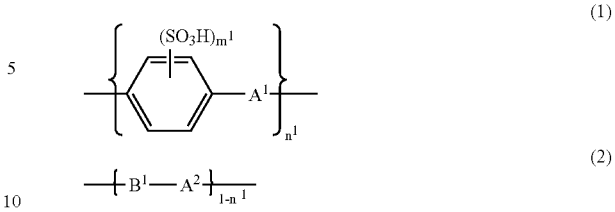

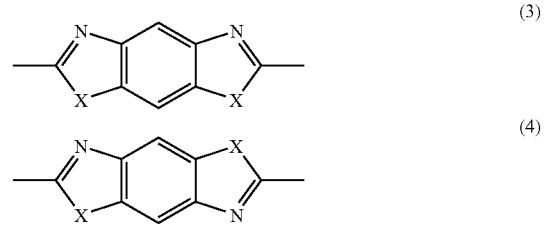

($m^1$ represents an integer of 1 to 4, $B^1$ represents a bivalent aromatic bond unit and each of $A^1$ and $A^2$ represents a bivalent bond unit expressed in either one of the following formulas (3) and (4) in each of the formulas (1) and (2) and $A^1$ and $A^2$ may be identical to or different from each other)

(X represents either S atom or O atom in each of the formulas (3) and (4)).

2. The polybenzazole compound according to claim 1, wherein a benzazole bond unit included in said polybenzazole compound is bonded by random polymerization and/or alternating polymerization.

3. The polybenzazole compound according to claim 1, including a benzoxazole bond unit and/or a benzthiazole bond unit and including the aromatic dicarboxylic acid bond unit having at least one sulfonic acid group in molecules, wherein the inherent viscosity measured in a methanesulfonic acid solution is in the range of 0.1 to 50 dl/g and the conductivity obtained by measuring complex impedance when applying a voltage of 10,000 Hz in frequency under conditions of 80° C. and 95% RH is in the range of 0.3 to 1.0 S/cm.

4. The polybenzazole compound according to claim 1, including a benzoxazole bond unit and the aromatic dicarboxylic acid bond unit having phosphonic acid group, wherein the conductivity obtained by measuring complex impedance when applying a voltage of 10,000 Hz in frequency under conditions of 80° C. and 95% RH is in the range of 0.01 to 1.0 S/cm.

5. The polybenzazole compound according to claim 1, including a benzimidazole bond unit, wherein solubility in N-methylpyrrolidone under a condition of 170° C. is at least 5% (w/w) and the inherent viscosity measured in concentrated sulfuric acid is in the range of 0.25 to 10 dl/g.

6. The polybenzazole compound according to claim 1, including a benzoxazole bond unit and including the aromatic dicarboxylic acid bond unit having at least one sulfonic acid group in molecules, wherein the inherent viscosity measured in a methanesulfonic acid solution is in the range of 0.1 to 50 dl/g and solubility in dimethylsulfoxide under a condition of 40° C. is at least 1% (w/w).

7. The polybenzazole compound according to claim 6, including bond units expressed in the following formulas (5) and (6) in a molar ratio $n^2:(1-n^2)$ as components, wherein said molar ratio satisfies an expression $0.85 \leq n^2 \leq 1.0$ and sulfonic acid groups in the form of alkaline metal salts are in the range of 0 to 15 mol % among all sulfonic acid groups:

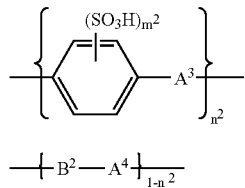
(5)

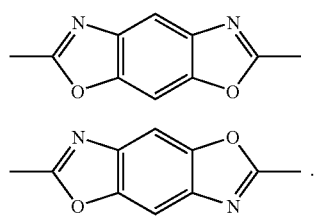
(6)

(m represents an integer of 1 to 4, $B^2$ represents a bivalent aromatic bond unit and each of $A^3$ and $A^4$ represents a bivalent bond unit expressed in either one of the following formulas (7) and (8) in each of the formulas (5) and (6) and $A^3$ and $A^4$ may be identical to or different from each other)

(7)

(8)

8. The polybenzazole compound according to claim 5, wherein conductivity obtained by measuring complex impedance when applying a voltage of 10,000 Hz in frequency under conditions of 80° C. and 95% RH is in the range of 0.001 to 1.0 S/cm.

9. The polybenzazole compound according to claim 3, including a benzoxazole bond unit and the aromatic dicarboxylic acid bond unit having a sulfonic acid group, wherein solubility in dimethylsulfoxide under a condition of 40° C. is at least 1% (w/w).

10. The polybenzazole compound according to claim 9, including bond units expressed in the following formulas (9) and (10) in a molar ratio $n^3$:(1−$n^3$) as components, wherein said molar ratio satisfies an expression $0.85 \leq n^3 \leq 1.0$ and sulfonic acid groups in the form of alkaline metal salts are in the range of 0 to 10 mol % among all sulfonic acid groups:

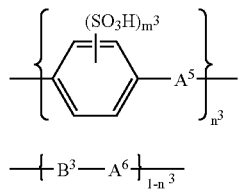
(9)

(10)

($m^3$ represents an integer of 1 to 4, $B^3$ represents a bivalent aromatic bond unit and each of $A^5$ and $A^6$ represents a bivalent bond unit expressed in either one of the following formulas (11) and (12) in each of the formulas (9) and (10) and $A^5$ and $A^6$ may be identical to or different from each other)

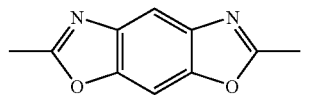
(11)

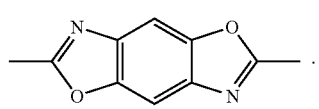
(12)

11. The polybenzazole compound according to claim 1, having at least 1.5 meq/g of sulfonic acid groups and/or phosphonic acid groups in molecules, wherein reduction of mass is in the range of 0 to 5% (w/w) when immersed in water of 25° C. for 72 hours.

12. The polybenzazole compound according to claim 11, including bond units expressed in the following formulas (13) and (14) in a molar ratio $n^4$:(1−$n^4$) as components, said molar ratio satisfying an expression $0.4 \leq n^4 1.0$:

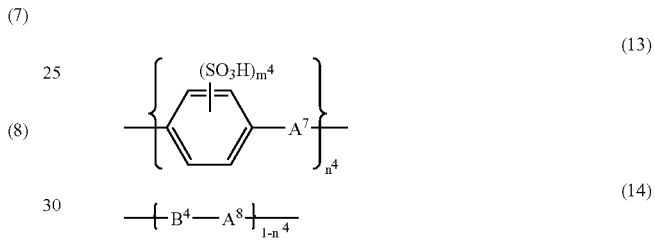
(13)

(14)

($m^4$ represents an integer of 1 to 4, $B^4$ represents a bivalent aromatic bond unit and each of $A^7$ and $A^8$ represents a bivalent bond unit expressed in either one of the following formulas (15) and (16) in each of the formulas (13) and (14) and $A^7$ and $A^8$ may be identical to or different from each other)

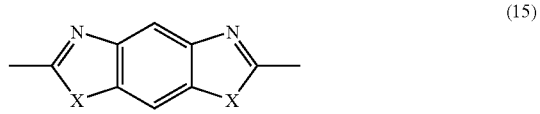
(15)

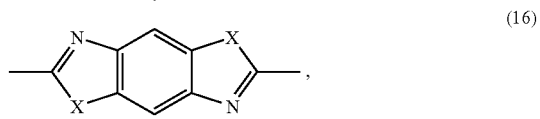
(16)

(X represents either S atom or O atom in each of the formulas (15) and (16)).

13. The polybenzazole compound according to claim 1, having at least 1.5 meq/g of sulfonic acid group in molecules, wherein reduction of mass is in the range of 0 to 5% (w/w) when immersed in water of 25° C. for 72 hours.

14. The polybenzazole compound according to claim 1, having at least 2.5 meq/g of sulfonic acid groups and/or phosphonic acid groups in molecules, wherein reduction of mass is in the range of 0 to 5% (w/w) when immersed in water of 25° C. for 72 hours and solubility in dimethylsulfoxide under a condition of 40° C. is at least 1% (w/w).

15. The polybenzazole compound according to claim 14, including bond units expressed in the following formulas (17) and (18) in a molar ratio $n^5$:(1−$n^5$) as components, said molar ratio satisfying an expression $0.85 \leq n^5 \leq 1.0$:

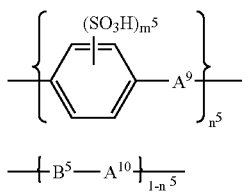

(17)

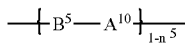

(18)

($m^5$ represents an integer of 1 to 4, $B^5$ represents a bivalent aromatic bond unit and each of $A^9$ and $A^{10}$ represents a bivalent bond unit expressed in either one of the following formulas (19) and (20) in each of the formulas (17) and (18) and $A^9$ and $A^{10}$ may be identical to or different from each other)

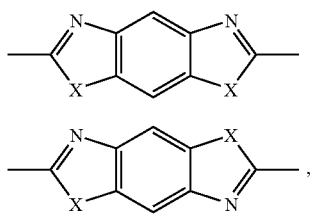

(19)

(20)

(X represents either S atom or O atom in each of the formulas (19) and (20)).

16. The polybenzazole compound according to claim 15, wherein conductivity obtained by measuring complex impedance when applying a voltage of 10,000 Hz in frequency under conditions of 80° C. and 95% RH is in the range of 0.3 to 1.0 S/cm.

17. A polybenzazole compound including an aromatic dicarboxylic acid bond unit having sulfonic acid group and optionally phosphonic acid group, satisfying either a condition that inherent viscosity measured in concentrated sulfuric acid is in the range of 0.25 to 10 dl/g or a condition that inherent viscosity measured in a methanesulfonic acid solution is in the range of 0.1 to 50 dl/g and including bond units expressed in the following formulas (21) and (22) in a molar ratio $n^6$:(1−$n^6$) as components, said molar ratio satisfying an expression $0.2 \leq n^6 \leq 1.0$:

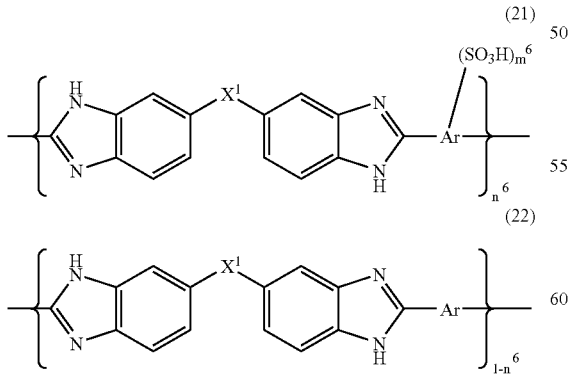

(21)

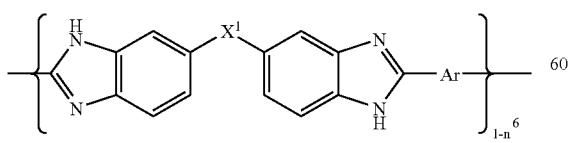

(22)

($m^6$ represents an integer of 1 to 4, Ar represents an aromatic bond unit, $X^1$ represents at least one selected from a group consisting of —O—, —SO$_2$—, —C(CH$_3$)$_2$—, —C(CF$_3$)$_2$— and —OPhO— and Ph represents a bivalent aromatic bond unit in each of the formulas (21) and (22)).

18. The polybenzazole compound according to claim 17, wherein conductivity obtained by measuring complex impedance when applying a voltage of 10,000 Hz in frequency under conditions of 80° C. and 95% RH is in the range of 0.01 to 1.0 S/cm.

19. The polybenzazole compound according to claim 17, including a benzimidazole bond unit, wherein solubility in N-methylpyrrolidone under a condition of 170° C. is at least 5% (w/w) and the inherent viscosity measured in concentrated sulfuric acid is in the range of 0.25 to 10 dl/g.

20. The polybenzazole compound according to claim 19, wherein conductivity obtained by measuring complex impedance when applying a voltage of 10,000 Hz in frequency under conditions of 80° C. and 95% RH is in the range of 0.001 to 1.0 S/cm.

21. The polybenzazole compound according to claim 17, wherein a 3% mass reduction temperature is in the range of 370 to 550° C. with reference to mass upon temperature rise to 200° C. in thermogravimetric analysis.

22. A polybenzazole compound including an aromatic dicarboxylic acid bond unit having phosphonic acid group and optionally sulfonic acid group, satisfying either a condition that inherent viscosity measured in concentrated sulfuric acid is in the range of 0.25 to 10 dl/g or a condition that inherent viscosity measured in a methanesulfonic acid solution is in the range of 0.1 to 50 dl/g and containing a bond unit selected from the following formulas (31) to (34):

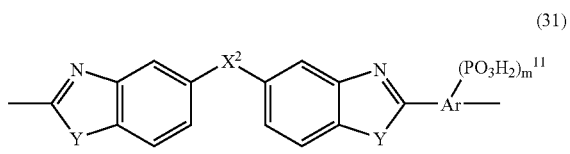

(31)

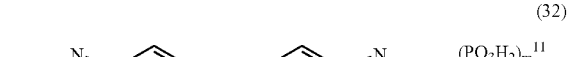

(32)

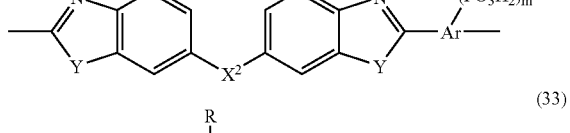

(33)

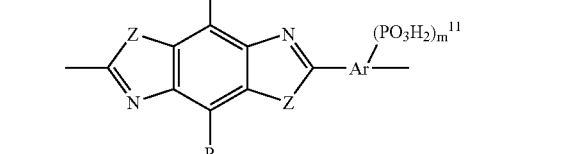

(34)

($m^{11}$ represents an integer of 1 to 4, Ar represents an aromatic bond unit, $X^2$ represents at least one selected from a group consisting of —O—, —SO$_2$—, —S—, —CO—, —CH$_2$— and —OPhO—, Y represents NH group, S atom or O atom, Z represents S atom or O atom, Ph represents a bivalent aromatic bond unit and R represents H atom or methyl groups in each of the formulas (31) to (34)).

23. The polybenzazole compound according to claim 22, including the aromatic dicarboxylic acid bond unit having phosphonic acid group, wherein conductivity obtained by measuring complex impedance when applying a voltage of 10,000 Hz in frequency under conditions of 80° C. and 95% RH is in the range of 0.001 to 1.0 S/cm.

24. The polybenzazole compound according to claim 22, including a benzoxazole bond unit and the aromatic dicarboxylic acid bond unit having phosphonic acid group, wherein conductivity obtained by measuring complex impedance when applying a voltage of 10,000 Hz in frequency under conditions of 80° C. and 95% RH is in the range of 0.01 to 1.0 S/cm.

25. The polybenzazole compound according to claim 22, including a benzimidazole bond unit, wherein solubility in N-methylpyrrolidone under a condition of 170° C. is at least 5% (w/w) and the inherent viscosity measured in concentrated sulfuric acid is in the range of 0.25 to 10 dl/g.

26. The polybenzazole compound according to claim 25, wherein conductivity obtained by measuring complex impedance when applying a voltage of 10,000 Hz in frequency under conditions of 80° C. and 95% RH is in the range of 0.001 to 1.0 S/cm.

27. The polybenzazole compound according to claim 22, having at least 2.5 meq/g of phosphonic acid groups and optionally sulfonic acid groups in molecules, wherein reduction of mass is in the range of 0 to 5% (w/w) when immersed in water of 25° C. for 72 hours, and solubility in dimethylsulfoxide under a condition of 40° C. is at least 1% (w/w).

28. The polybenzazole compound according to claim 22, including the aromatic dicarboxylic acid bond unit having phosphonic acid group, wherein a 3% mass reduction temperature is in the range of 400 to 550° C. with reference to mass upon temperature rise to 200° C in thermogravimetric analysis.

29. The polybenzazole compound according to claim 28, wherein solubility in N-methylpyrrolidone under a condition of 170° C. is at least 5% (w/w).

30. The polybenzazole compound according to claim 29, wherein conductivity obtained by measuring complex impedance when applying a voltage of 10,000 Hz in frequency under conditions of 80° C. and 95% RH is in the range of 0.001 to 1.0 S/cm.

31. A polybenzazole compound including an aromatic dicarboxylic acid bond unit having sulfonic acid group and optionally phosphonic acid group, satisfying either a condition that inherent viscosity measured in concentrated sulfuric acid is in the range of 0.25 to 10 dl/g or a condition that inherent viscosity measured in a methanesulfonic acid solution is in the range of 0.1 to 50 dl/g and the aromatic dicarboxylic acid bond unit having sulfonic acid group is a 2,2'-disulfo-4,4'-biphenyldicarboxylic acid bond unit.

32. A resin composition containing the polybenzazole compound according to claim 1, and a polybenzazole compound having no ionic group as main components.

33. A resin molding containing the polybenzazole compound according to claim 1, as a main component.

34. A solid polymer electrolyte membrane containing the polybenzazole compound according to claim 1, as a main component.

35. A solid polymer electrolyte membrane/electrode assembly including a solid polymer electrolyte membrane and electrode catalytic layers joined to both surfaces of said solid polymer electrolyte membrane as components, wherein said solid polymer electrolyte membrane and/or said electrode catalytic layers contain the polybenzazole compound according to claim 1, as a component.

36. The solid polymer electrolyte membrane/electrode assembly according to claim 35, wherein the polybenzazole compound forming the solid polymer electrolyte membrane and/or the electrode catalytic layers has at least 2.5 meq/g of sulfonic acid groups and/or phosphonic acid groups in molecules.

37. A method of preparing a solid polymer electrolyte membrane/electrode assembly including a step of bonding a solid polymer electrolyte membrane and electrode catalytic layers joined to both surfaces of said solid polymer electrolyte membrane to each other with a binder, wherein said solid polymer electrolyte membrane and/or said electrode catalytic layers contain the polybenzazole compound according to claim 1, as a component, and the binder also contains the polybenzazole compound according to claim 1 as a component.

38. The method of preparing a solid polymer electrolyte membrane/electrode assembly according to claim 37, wherein the polybenzazole compound forming the solid polymer electrolyte membrane and/or the electrode catalytic layers has at least 2.5 meq/g of sulfonic acid groups and/or phosphonic acid groups in molecules, and the polybenzazole compound forming the binder also has at least 2.5 meq/g of sulfonic acid groups and/or phosphonic acid groups in molecules.

39. A polybenzazole compound including an aromatic dicarboxylic acid bond unit having sulfonic acid group and optionally phosphonic acid group and satisfying either a condition that inherent viscosity measured in concentrated sulfuric acid is in the range of 0.25 to 10 dl/g or a condition that inherent viscosity measured in a methanesulfonic acid solution is in the range of 0.1 to 50 dl/g, wherein conductivity obtained by measuring complex impedance when applying a voltage of 10,000 Hz in frequency under conditions of 80° C. and 95% RH is in the range of 0.001 to 1.0 S/cm if said aromatic dicarboxylic acid bond unit contains phosphonic acid group and conductivity obtained by measuring complex impedance when applying a voltage of 10,000 Hz in frequency under conditions of 80° C. and 95% RH is in the range of 0.01 to 1.0 S/cm if said aromatic dicarboxylic acid bond unit contains no phosphonic acid group, wherein the aromatic dicarboxylic acid bond unit having sulfonic acid group is 2,2'-disulfo-4,4'-biphenyldicarboxylic acid bond unit.

40. A resin composition containing the polybenzazole compound according to claim 17 and a polybenzazole compound having no ionic group as main components.

41. A resin composition containing the polybenzazole compound according to claim 22 and a polybenzazole compound having no tonic group as main components.

42. A resin molding containing the polybenzazole compound according to claim 17, as a main component.

43. A resin molding containing the polybenzazole compound according to claim 22, as a main component.

44. A solid polymer electrolyte membrane containing the polybenzazole compound according to claim 17, as a main component.

45. A solid polymer electrolyte membrane containing the polybenzazole compound according to claim 22, as a main component.

46. A solid polymer electrolyte membrane/electrode assembly including a solid polymer electrolyte membrane and electrode catalytic layers joined to both surfaces of said solid polymer electrolyte membrane as components, wherein said solid polymer electrolyte membrane and/or said electrode catalytic layers contain the polybenzazole compound according to claim 17, as a component.

47. A solid polymer electrolyte membrane/electrode assembly including a solid polymer electrolyte membrane and electrode catalytic layers joined to both surfaces of said solid polymer electrolyte membrane as components, wherein said solid polymer electrolyte membrane and/or said electrode catalytic layers contain the polybenzazole compound according to claim 22, as a component.

48. A method of preparing a solid polymer electrolyte membrane/electrode assembly including a step of bonding a solid polymer electrolyte membrane and electrode catalytic layers joined to both surfaces of said solid polymer electrolyte membrane to each other with a binder, wherein said solid polymer electrolyte membrane and/or said electrode catalytic layers contain the polybenzazole compound according to claim 17, as a component, and the binder also contains the polybenzazole compound according to claim 17 as a component.

49. A method of preparing a solid polymer electrolyte membrane/electrode assembly including a step of bonding a solid polymer electrolyte membrane and electrode catalytic layers joined to both surfaces of said solid polymer electrolyte membrane to each other with a binder, wherein said solid polymer electrolyte membrane and/or said electrode catalytic layers contain the polybenzazole compound according to claim 22, as a component, and the binder also contains the polybenzazole compound according to claim 22 as a component.

* * * * *